（12）United States Patent
Sundaram et al.

(10) Patent No.: US 11,935,525 B1
(45) Date of Patent: Mar. 19, 2024

(54) SPEECH PROCESSING OPTIMIZATIONS BASED ON MICROPHONE ARRAY

(71) Applicant: Amazon Technologies, Inc., Seattle, WA (US)

(72) Inventors: Shiva Kumar Sundaram, Mountain View, CA (US); Minhua Wu, San Jose, CA (US); Anirudh Raju, San Jose, CA (US); Spyridon Matsoukas, Hopkinton, MA (US); Arindam Mandal, Redwood City, CA (US); Kenichi Kumatani, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 24 days.

(21) Appl. No.: 16/895,377

(22) Filed: Jun. 8, 2020

Related U.S. Application Data

(63) Continuation of application No. 15/927,764, filed on Mar. 21, 2018, now Pat. No. 10,679,621.

(51) Int. Cl.
*G10L 15/22* (2006.01)
*G06F 40/40* (2020.01)
(Continued)

(52) U.S. Cl.
CPC .............. *G10L 15/22* (2013.01); *G06F 40/40* (2020.01); *G10L 15/187* (2013.01); *G10L 15/26* (2013.01); *G10L 15/30* (2013.01); *G10L 21/0208* (2013.01); *H04R 3/005* (2013.01); *G10L 2015/088* (2013.01); *G10L 2015/223* (2013.01); *G10L 2021/02166* (2013.01); *H04W 4/025* (2013.01)

(58) Field of Classification Search
CPC ..... G10L 15/22; G10L 21/0208; G10L 15/26; G10L 15/08; G10L 15/30; G10L 15/187; G10L 2015/088; G10L 2015/223; G10L 2021/02166; G10L 21/0216; H04R 3/005; H04R 25/407; H04R 3/00; G06F 40/30; G06F 40/40; H04W 4/025; H04W 4/02
See application file for complete search history.

(56) References Cited

U.S. PATENT DOCUMENTS 7,515,721 B2     4/2009    Tashev et al.
10,152,968 B1 *   12/2018   Agrusa ................... G06F 3/167
(Continued)

OTHER PUBLICATIONS

Non Final Office Action dated Oct. 15, 2019 for U.S. Appl. No. 15/927,764 "Speech Processing Optimizations Based on Microphone Array" Sundaram, 17 pages.

*Primary Examiner* — Huyen X Vo
(74) *Attorney, Agent, or Firm* — Lee & Hayes, P.C.

(57) ABSTRACT

Systems and methods for utilizing microphone array information for acoustic modeling are disclosed. Audio data may be received from a device having a microphone array configuration. Microphone configuration data may also be received that indicates the configuration of the microphone array. The microphone configuration data may be utilized as an input vector to an acoustic model, along with the audio data, to generate phoneme data. Additionally, the microphone configuration data may be utilized to train and/or generate acoustic models, select an acoustic model to perform speech recognition with, and/or to improve trigger sound detection.

20 Claims, 8 Drawing Sheets

(51) Int. Cl.
   *G10L 15/187* (2013.01)
   *G10L 15/26* (2006.01)
   *G10L 15/30* (2013.01)
   *G10L 21/0208* (2013.01)
   *H04R 3/00* (2006.01)
   *G10L 15/08* (2006.01)
   *G10L 21/0216* (2013.01)
   *H04W 4/02* (2018.01)

(56) References Cited

U.S. PATENT DOCUMENTS

| | | | |
|---|---|---|---|
| 2004/0059575 A1* | 3/2004 | Brookes | G10L 15/08 |
| | | | 704/254 |
| 2005/0080632 A1* | 4/2005 | Endo | G10L 15/08 |
| | | | 704/277 |
| 2010/0049516 A1 | 2/2010 | Talwar et al. | |
| 2012/0191449 A1* | 7/2012 | Lloyd | H04M 1/6075 |
| | | | 704/E15.001 |
| 2014/0278394 A1 | 9/2014 | Bastyr et al. | |
| 2015/0058003 A1* | 2/2015 | Mohideen | G10L 15/20 |
| | | | 704/233 |
| 2015/0221300 A1* | 8/2015 | Sukhomlinov | G10L 15/08 |
| | | | 704/246 |
| 2016/0171976 A1 | 6/2016 | Sun et al. | |
| 2016/0196491 A1* | 7/2016 | Chandrasekaran | G06F 40/30 |
| | | | 706/50 |
| 2016/0322055 A1 | 11/2016 | Sainath et al. | |
| 2016/0350280 A1* | 12/2016 | Lavallee | G06F 40/284 |
| 2017/0061100 A1* | 3/2017 | Sati | G06F 16/24575 |
| 2017/0187711 A1* | 6/2017 | Joo | G10L 15/30 |
| 2017/0289766 A1* | 10/2017 | Scott | H04W 4/023 |
| 2018/0052824 A1* | 2/2018 | Ferrydiansyah | G06F 40/30 |
| 2018/0121389 A1* | 5/2018 | Jochim | G06F 30/00 |
| 2018/0174580 A1* | 6/2018 | Kim | G10L 15/22 |

* cited by examiner

SPEECH PROCESSING OPTIMIZATIONS BASED ON MICROPHONE ARRAY

RELATED APPLICATIONS

This application claims priority to and is a continuation of U.S. patent application Ser. No. 15/927,764, filed on Mar. 21, 2018, the entire contents of which are incorporated herein by reference.

BACKGROUND

A user may provide a user utterance to a computing system. The computing system may process audio data corresponding to the user utterance using automatic speech recognition. Described herein are improvements in technology and solutions to technical problems that can be used to, among other things, increase the accuracy of speech processing systems.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
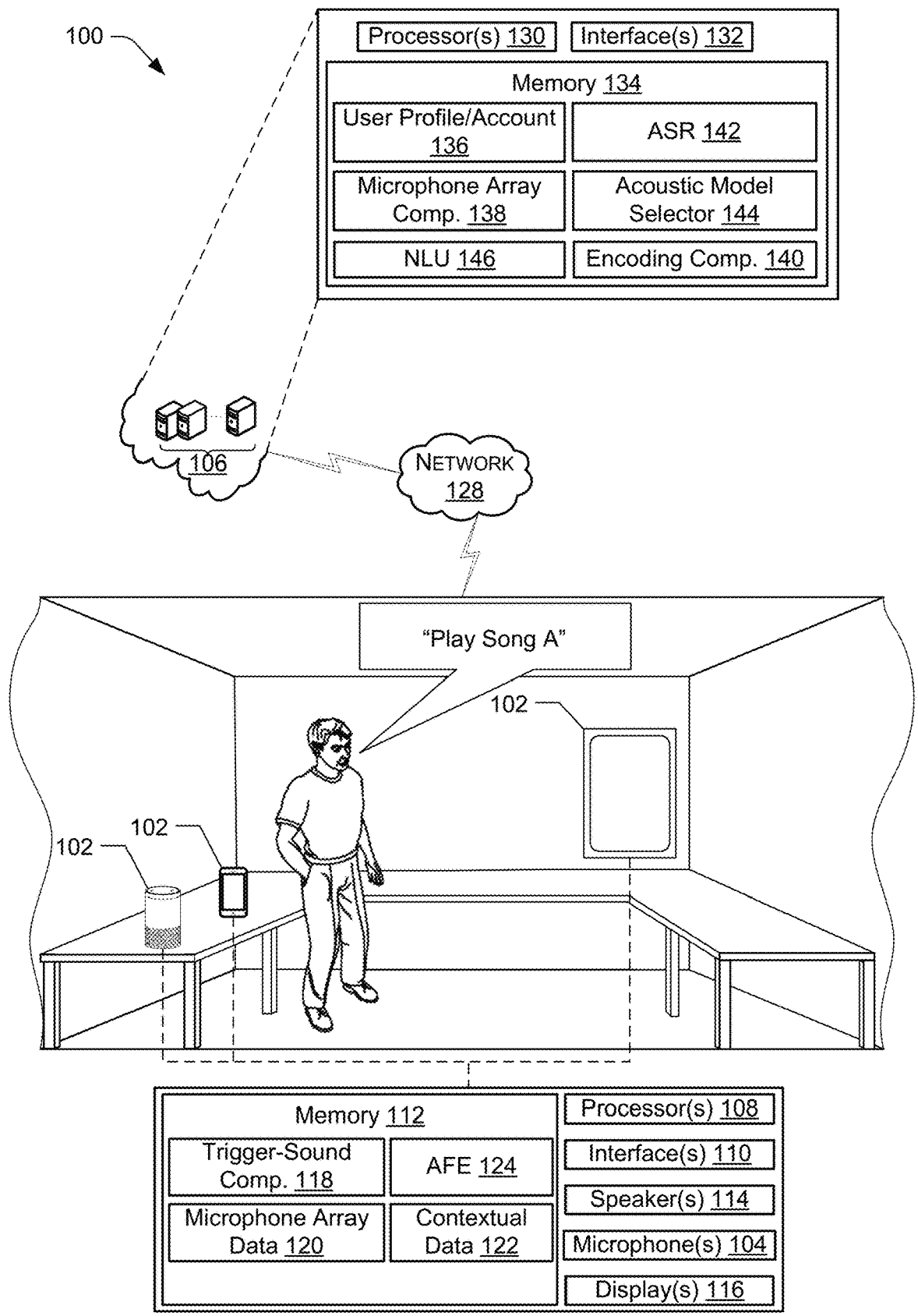
FIG. 1 illustrates a schematic diagram of an example environment for utilizing microphone array information for acoustic modeling.

Systems and methods for utilizing microphone array information for acoustic modeling are described herein. Take, for example, a speech processing system that is configured to receive audio data representing a user utterance and perform automatic speech recognition (ASR) on that audio data to generate text data corresponding to the audio data. The device from which the audio data is received may include a microphone array with microphones configured in a certain way. For example, one device may have a microphone array with six microphones arranged in a hexagon geometry and spaced equal or substantially equal distances from each other. Another device may have a microphone array with four microphones arranged three centimeters apart from each other in a square geometry. Another device may have a microphone array with three microphones arranged four centimeters apart from each other in a triangular geometry. Still other devices may have other microphone array configurations. When a user provides a user utterance, the microphones of the microphone array may capture audio corresponding to the user utterance and may generate audio data. In some examples, the device includes beamforming techniques that process signals received from the microphones in the microphone array and identify, determine, and/or generate optimized audio data to be utilized by a speech processing system. In other examples, the device may not include beamforming techniques, and as such, the audio data provided to the speech processing system may include a multi-channel input representing an audio signal from each of the microphones in the microphone array.

The speech processing system may receive the audio data and attempt to determine what was said in the user utterance. The audio data may be segmented into frame data, which represent portions of the audio data, with each portion associated with an interval of time (sometimes, such a portion of audio data is referred to herein as a "frame"). For each frame, the attributes of the audio data may be analyzed by a speech recognition engine, such as by utilizing one or more acoustic models, to determine a phoneme that most likely corresponds to each frame of the audio data. For example, each frame of the audio data may be associated with one or more audio frequencies, and each frequency may have an amplitude and phase. This information may be utilized by the acoustic model, such as in a neural network, to associate the attributes of the audio data frame to phonemes. The association may include a likelihood that one or more phonemes correspond to the audio data frame along with one or more probabilities and/or confidences that the phoneme corresponds to the audio data frame.

In examples, the configuration of an example microphone array may impact the attributes of the audio data even though the user utterance spoken by the user is the same. As such, acoustic models may be trained or otherwise configured to perform the association described above for certain devices with known microphone array configurations. In some examples, such as when the speech processing system includes multiple acoustic models, an acoustic model may be selected to perform the association described herein based at least in part on data indicating the type of device from which the audio data was received. However, when the device from which the audio data was received has a microphone array configuration that does not match a configuration for which the acoustic models are trained to process, accuracy of the acoustic model association of audio data to phonemes may be reduced.

To enhance the effectiveness of a speech processing system's acoustic models, the present innovation may utilize microphone configuration data in a number of ways. For example, in addition to receiving audio data representing a user utterance from a device, the speech processing system may also receive microphone configuration data indicating a configuration of the microphone array of the device from which the audio data was received. In other examples, the microphone configuration data may be identified, determined, and/or generated by the speech processing system, such as by utilizing one or more descriptors of the device and/or the microphone array configuration of the device and determining at least a portion of the configuration of the microphone array. The microphone configuration data may then be encoded as an input vector to be utilized, along with the audio data, by an acoustic model.

The audio data may be segmented into frames, as described more fully herein, and an acoustic model may be selected to associate the frames to phonemes. For example, the microphone configuration data may be utilized to identify the acoustic model that has been trained to handle speech-recognition requests from devices with the microphone array geometry or from devices with similar microphone array geometries. Thereafter, the acoustic model may be utilized to process the audio data frames and output phoneme data. The processing may include the use of a neural network configured to determine which phoneme best represents a given frame of the audio data. The microphone array input vector may be utilized to inform the probability that one or more phonemes correspond to the audio data frame. For example, without the microphone array input vector, the acoustic model may determine that a given audio data frame corresponds to a first phoneme with a 60% confidence level and to a second phoneme with a 50% confidence level. However, by utilizing the microphone array input vector to identify how the microphone array configuration affects attributes of the audio data, the acoustic model may determine that the audio data frame in question corresponds to the first phoneme with a 70% confidence level and to the second phoneme with a 30% confidence level. In this example, use of the microphone array input vector improves the accuracy of the association between the audio data frames and phonemes. Phoneme data may be generated indicating the phonemes associated with the audio data, and the phoneme data may be further utilized by the speech processing system to generate text data corresponding to the audio data.

Additionally, or alternatively, the microphone configuration data may be utilized to train existing acoustic models and/or to generate a new acoustic model. Additionally, or alternatively, such as in examples where the device from which the audio data was received does not include beamforming functionality, the microphone configuration data may be utilized by the speech processing system to optimize the audio data before processing by the acoustic model. Additionally, or alternatively, the microphone configuration data and/or acoustic models trained based at least in part on audio data associated with particular type of the microphone configuration data may be utilized by the device having the microphone array to improve functioning of an acoustic front end of the device, such as when the device is configured with beamforming functionality, and/or a trigger-sound component of the device.

Additionally, or alternatively, contextual data may be utilized by the speech processing system to more accurately generate the phoneme data. For example, the contextual data may include at least one of global positioning data indicating a location of the device, device location data indicating a location of the device within a specific environment, such as a home, and/or speaker location data indicating a location of a user speaking the user utterance in relation to the device. Additionally, or alternatively, the contextual data may include device-state data, which may indicate a state of a device that captured the user speech. This contextual data may be utilized to inform selection of an acoustic model and/or the contextual data may be encoded as additional, or alternative, input vectors to an acoustic model to increase the accuracy of the acoustic model's ability to associate audio data frames to phonemes.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for utilizing microphone array information for acoustic modeling. The system 100 may include, for example, one or more devices 102 that include microphones 104. The devices 102 may be communal devices, such as voice-assistant devices, that may be utilized by multiple users, and/or the devices 102 may include personal devices, such as mobile phones. It should be understood that the devices 102 may be wired or otherwise plugged into a power source or may be wireless or otherwise powered by a battery. It should also be noted that a device 102 may have microphones 104 housed within or partially within them, and/or the device 102 may be associated with one or more microphones 104 situated around an environment but not necessarily housed within or partially within the device 102. The devices 102 may be designed and/or configured to receive user utterances and perform one or more operations based at least in part on the user utterances. In some examples, the devices 102 may also be designed and/or configured to provide other functionality. For example, the devices 102 may perform the functions of a kitchen appliance, a television, a toy, a bathroom appliance, a computer, etc. As illustrated in FIG. 1, the depicted devices 102 include a communal device, a personal device, and a mirror. The devices 102 may be designed, manufactured, and/or sold by the same entity that maintains and/or controls a remote system 106, such as a speech processing system. In other examples, one or more of the devices 102 may be designed, manufactured, and/or sold by a separate entity from the entity that maintains and/or controls the remote system 106. In these examples, the devices 102 may be described as third-party devices.

The devices 102 may include various computing components, such as one or more processors 108, one or more network interfaces 110, memory 112, one or more microphones 104, one or more speakers 114, and/or one or more displays 116. The microphones 104 may be described as a microphone array that has a microphone array configuration. The microphone array configuration may include a number of microphones 104 in the microphone array, a spacing of the microphones 104 from each other, a type of microphone 104 utilized in the microphone array, a microphone geometry, and/or a location of the microphone array with respect to other components of the device. Each of the devices 102 may have the same microphone array configuration or differing microphone array configurations. The memory 112 of the devices 102 may include one or more components, such as, for example, a trigger-sound component 118, a microphone configuration data component 120, a contextual data component 122, and/or an acoustic front end (AFE) component 124. Each of these components will be described in detail below.

The trigger-sound component 118 may be configured to identify a trigger sound in a user utterance. Identification of the trigger sound may cause the device 102 to transition from a first state to a second state. For example, the device 102 may be configured, in the first state, to receive user utterances and locally process the corresponding audio data to determine if a trigger sound, also described as a wake word, has been spoken by a user.

Based at least in part on identifying the trigger sound, the device 102 may be configured, in the second state, to send audio data to the remote system 106 for more robust speech processing. It should be understood that while the trigger-sound component 118 has been described herein as a component that controls the state of the device 102, description of the various functionalities of the device 102 in terms of states is provided by way of example. Alternatively, state transitions may not be utilized and instead functionalities may be utilized or not utilized depending on the identification of a trigger sound by the trigger-sound component 118. By way of example, the trigger-sound component 118 may identify the trigger sound "Alexa" in the user utterance and may "wake" based on identifying the trigger sound. Audio data corresponding to the user utterance may be sent to the remote system 106 where a speech recognition engine of the remote system 106 may identify, determine, and/or generate text data corresponding to the user utterance, for example.

The microphone configuration data component 120 may be configured to identify, determine, and/or store microphone configuration data indicating a configuration of the microphones 104 in the microphone array. For example, microphone configuration data may be provided by the developer of the device 102, and that data may be stored in the microphone configuration data component 120 of the memory 112 of the device 102. In other examples, while microphone configuration data may not be provided by the developer of the device 102, one or more attributes of the microphones 104 may be described and/or encoded into the device. Information indicating these attributes may be identified, determined, and/or stored in the microphone configuration data component 120. The microphone configuration data component 120 may be queried or otherwise utilized to obtain the microphone configuration data and provide the microphone configuration data to the remote system 106.

The contextual data component 122 may be configured to identify, determine, generate, and/or store contextual data indicating contextual information associated with the device 102. For example, the contextual data may include global positioning data indicating a global positioning location of the device 102. The global positioning data may include global positioning coordinates and/or one or more descriptions of the global positioning location of the device 102, such as a street address, a city identification, a county identification, a state identification, and/or a country identification. Additionally, or alternatively, the contextual data may include device location data indicating a location and/or position of the device 102 with respect to a given environment. For example, the device location data may indicate that the device 102 is located in a specific room of a home or an office. The device location data may additionally, or alternatively, indicate the location of the device 102 relative to one or more objects in and/or of the environment. For example, the device location data may indicate that the device 102 is situated near a wall, near a source of background noise such as a sink, refrigerator, or television, near a ceiling, near a floor, and/or near a window. The location of the device 102 with respect to its environment may affect the audio captured by the microphones 104 of the device, and as such, the device location data may be utilized to account for the location of the device 102 when speech processing is performed.

Additionally, or alternatively, the contextual data may include speaker location data indicating a location or relative location of a speaker with respect to the device 102. For example, the speaker location data may indicate that the speaker is a certain distance or within a distance range of the device 102 and/or that the speaker is positioned nearer to one of the microphones 104 than to other microphones 104 in the microphone array. The contextual data may be identified, determined, and/or generated by the contextual data component 122 and may be utilized by the AFE component 124 of the device 102 and/or be provided to the remote system 106 for speech processing.

Additionally, or alternatively, the contextual data may include device-state data, which may indicate a state of the device from which the audio data was received. For example, a device may be in one or more states. The states, by way of example and not as a limitation, may include an "on" state, an "off" state, a "standby" state, a "playing music" state, an "audio-output" state, etc. Metadata indicating the state of the device 102 may be identified, determined, and/or generated and may be sent to the remote system 106 to assist in speech processing.

The AFE component 124 of the device 102 may be configured to process audio data received from the microphones 104. This processing may include beamform and noise cancellation techniques described in more detail with respect to FIG. 5.

The speaker(s) 114 of the device 102 may be utilized to output audio, such as to the user. For example, in response to a user utterance, the device 102 may perform an operation corresponding to the user utterance and confirmation that the device 102 has performed and/or will perform the operation may be audibly output via the speaker(s) 114. The display(s) 116 of the device 102 may be utilized to output images, such as to the user. For example, in response to a user utterance, the device 102 may perform an operation corresponding to the user utterance and confirmation that the device 102 has performed and/or will perform the operation may be visually output via the display(s).

The device 102 may send and receive data, such as via a network 128, with other devices 102 and/or the remote system 106. The data may include the audio data, the microphone configuration data, and/or the contextual data, for example.

The remote system 106 may include one or more computing components, such as, for example, one or more processors 130, one or more network interfaces 132, and memory 134. The memory 134 of the remote system 106 may include one or more components, such as, for example, a user profile/account component 136, a microphone array component 138, an encoding component 140, a backend automatic speech recognition (ASR) component 142, an acoustic model selector 144, and a natural language understanding (NLU) component 146. Each of these components will be described in detail below.

The user profiles/accounts component 136 may be configured to identify, determine, and/or generate associations between users, user profiles, user accounts, and/or devices.

For example, one or more associations between the devices 102, environments, networks 128, users, user profiles, and/or user accounts may be identified, determined, and/or generated by the user profile/account components 136. The user profile/account component 136 may additionally store information indicating one or more applications accessible to the devices 102 and/or one or more functionalities utilized by the devices 102, such as, for example, beamforming functionalities. It should be understood that the devices 102 may be associated with one or more other devices 102, one or more environments, one or more applications stored on and/or accessible by the devices 102, and/or one or more users. It should also be understood that that a user account may be associated with one or more than one user profile. The user profiles/accounts component 136 may also store associations between devices 102 and acoustic models selected, for example, by the acoustic model selector 144, to perform speech recognition with.

The microphone array component 138 may be configured to receive, identify, determine, generate, and/or store microphone configuration data, such as described with respect to the microphone configuration data component 120 of the devices 102. For example, microphone configuration data may be provided by the developer of the device 102, and that data may be stored in the microphone array component 138 of the memory 134 of the remote system 106. In other examples, while microphone configuration data may not be provided by the developer of the device 102, one or more attributes of the microphones 104 may be described and/or encoded into the device. Information indicating these attributes may be identified, determined, and/or stored in the microphone array component 138. The microphone array component 138 may receive microphone configuration data from the devices 102.

In examples, where the microphone configuration data is not provided by the devices 102. The microphone array component 138 may determine and/or generate the microphone configuration data by analyzing descriptors of the device 102. For example, publicly-available materials and/or server-facing code may provide one or more indications of the microphones included in the device 102 and/or the configuration of those microphones. In examples, the indications may be descriptions of the microphones and the microphone array component 138 may analyze those descriptions, such as via keyword identification and comparison with stored and/or accessible microphone configuration information, to determine and/or generate the microphone configuration data.

An example is provided herein to illustrate this functionality. A device 102 may include four microphones spaced four centimeters apart from each other in a square geometry. Microphone configuration data indicating this microphone configuration may be provided by the developer of the device 102 and may be received, from the device 102, by the microphone array component 138. In other examples, the microphone configuration data may not be provided by the developer, but a descriptor of a given microphone configuration may be found in accessible materials describing the device 102, such as technical specifications and/or server-facing code. The descriptors may be identified as keywords and may be analyzed with respect to and/or compared to stored and/or accessible keywords associated with microphone array configuration. In this example, the technical specification of the device 102 may provide an identifier of the microphone array and/or may describe the configuration of the microphone array. Descriptor from the technical specification associated with the microphone array configuration may be identified and compared to stored and/or accessible microphone array configuration descriptions to determine a match or best match.

The encoding component 140 may be configured to encode the microphone configuration data as an input vector to an acoustic model. The encoding may comprise, for example, identifying, determining, and/or generating one or more representations of the microphone configuration data, such as numerical and/or textual representations, that may be utilized by the acoustic models.

The ASR component 142 may be configured to receive the audio data from the device 102 and generate text data corresponding to the audio data. The text data may include words corresponding to the human speech. The ASR component 142 is described in more detail below with respect to FIG. 5. For purposes of illustration, upon receipt by the remote system 106, the ASR component 142 may convert the audio data into text. The ASR component 142 may transcribe the audio data into text data representing the words of the speech contained in the audio data. The text data may then be used by other components for various purposes, such as executing system commands, inputting data, etc. A spoken utterance in the audio data is input to a processor configured to perform ASR, which then interprets the utterance based on the similarity between the utterance and pre-established models stored in an ASR model knowledge base. For example, the ASR process may compare the input audio data with models for sounds, such as subword units or phonemes, and sequences of sounds to identify words that match the sequence of sounds spoken in the utterance of the audio data.

The different ways a spoken utterance may be interpreted, which may be described as different hypotheses, may each be assigned a probability or a confidence score representing the likelihood that a particular set of words matches those spoken in the utterance. The confidence score may be based on a number of factors including, for example, the similarity of the sound in the utterance to models for language sounds, such as via an acoustic model 144, and the likelihood that a particular word that matches the sounds would be included in the sentence at the specific location, which may be determined by a language or grammar model. Thus, each potential textual interpretation of the spoken utterance (hypothesis) is associated with a confidence score. Based on the considered factors and the assigned confidence score, the ASR process outputs the most likely text recognized in the audio data.

The ASR component 142 may also include an acoustic front end (AFE), which may reduce noise in the audio data and divide the audio data into frames representing time intervals for which the AFE determines a number of values, called features, representing the qualities of the audio data, along with a set of those values, called a feature vector and/or an input vector, representing the features/qualities of the audio data within the frame. Many different features may be determined, and each feature represents some quality of the audio that may be useful for ASR processing.

In examples, multiple AFEs may be utilized and the microphone configuration data may be utilized to increase accuracy of the AFEs, select one AFE over another AFEs/or train one or more of the AFEs. By way of example, a first AFE may be configured to process audio data generated by microphones of one or more first microphone array geometries, while a second AFE may be configured to process audio data generated by microphones of one or more second microphone array geometries. In this example, the first microphone array geometries may differ in one or more aspects, such as number of microphones, microphone spacing, microphone type, and/or microphone geometry, from the second microphone array geometries.

A speech recognition engine of the ASR component 142 may process the output from the AFE along with an input vector generated by, for example, the encoding component 140, with reference to information stored in acoustic models. Alternatively, post front-end processed data, such as feature vectors, may be received by the device executing ASR processing from another source besides the internal AFE. For example, the user device 102 may process audio data into feature vectors, for example using an on-device AFE, and transmit that information to the remote system 106 across the network 128 for ASR processing. Feature vectors may arrive at the remote system 106 encoded, in which case they may be decoded prior to processing by the processor executing the speech recognition engine.

The speech recognition engine may attempt to match received feature vectors to language phonemes and words as known in the stored acoustic models and language models. The speech recognition engine computes recognition scores for the feature vectors based on acoustic information, language information, and the microphone array input vector. The acoustic information is used to calculate an acoustic score representing a likelihood that the intended sound represented by a group of feature vectors matches a language phoneme. The microphone array input vector may be utilized to modify the features vectors, modify the association of the feature vectors to the phonemes, and/or to modify the likelihood that the intended sound represented by the group of feature vectors matches a language phoneme. Additionally, or alternatively, the microphone array input vector may be utilized to expand the number of dimensions input into the acoustic model and/or utilized by the acoustic model to match a language phoneme. Phoneme data may be generated that correlates the audio data with phonemes. The language information is used to adjust the acoustic score by considering what sounds and/or words are used in context with each other, thereby improving the likelihood that the ASR process will output speech results that make sense grammatically. The specific models used may be general models or may be models corresponding to a particular microphone array configuration or set of microphone array configurations.

In examples, the ASR component 142 may additionally, or alternatively, be configured to compare the audio data with reference sounds that do not include user utterances. The frames of the audio data may be analyzed using the acoustic models to determine the probability that a given sound, such as a reference sound, matches a frame of the audio data.

The acoustic model selector 144 may be configured to select an acoustic model of the acoustic models to perform speech recognition. The acoustic model selector 144 may select the acoustic model based at least in part on the microphone configuration data. For example, the acoustic models may be configured and/or trained to process speech-recognition requests from devices with various microphone array configurations. For example, a first acoustic model may be configured and/or trained to process requests from devices with seven microphones 104 in the microphone array with spacing between about one centimeter and about five centimeters. A second acoustic model, for example, may be configured and/or training to process requests from devices with three microphones 104 or four microphones 104. Based at least in part on the microphone configuration data, the acoustic model selector 144 may analyze the microphone array configuration of the device 102 from which the audio data was received and determine the acoustic model configured to process requests from devices with microphone arrays that match or most closely match the microphone array configuration in question.

The NLU component 146 may utilize the text data generated by the ASR component 142 to determine intent data representing an intent of the user utterance. NLU techniques are described in more detail with respect to FIG. 5, below.

As used herein, a processor, such as processor(s) 108 and 130, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and 130 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and 130 may possess its own local memory, which also may store program components, program data, and/or one or more operating systems.

The memory 112 and 134 may include volatile and nonvolatile memory, removable and non-removable media implemented in any method or technology for storage of information, such as computer-readable instructions, data structures, program component, or other data. Such memory 112 and 134 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and 134 may be implemented as computer-readable storage media ("CRSM"), which may be any available physical media accessible by the processor(s) 108 and 130 to execute instructions stored on the memory 110 and 132. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and 134, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and 132 may enable communications between the components and/or devices shown in system 100 and/or with one or more other remote systems, as well as other networked devices. Such network interface(s) 110 and 132 may include one or more network interface controllers (NICs) or other types of transceiver devices to send and receive communications over the network 128.

For instance, each of the network interface(s) 110 and 132 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 110 and 132 may include a wide area network (WAN) component to enable communication over a wide area network.

In some instances, the remote system 106 may be local to an environment associated the device 102. For instance, the remote system 106 may be located within the device 102. In some instances, some or all of the functionality of the remote system 106 may be performed by one or more of the devices 102.

Figure 2:
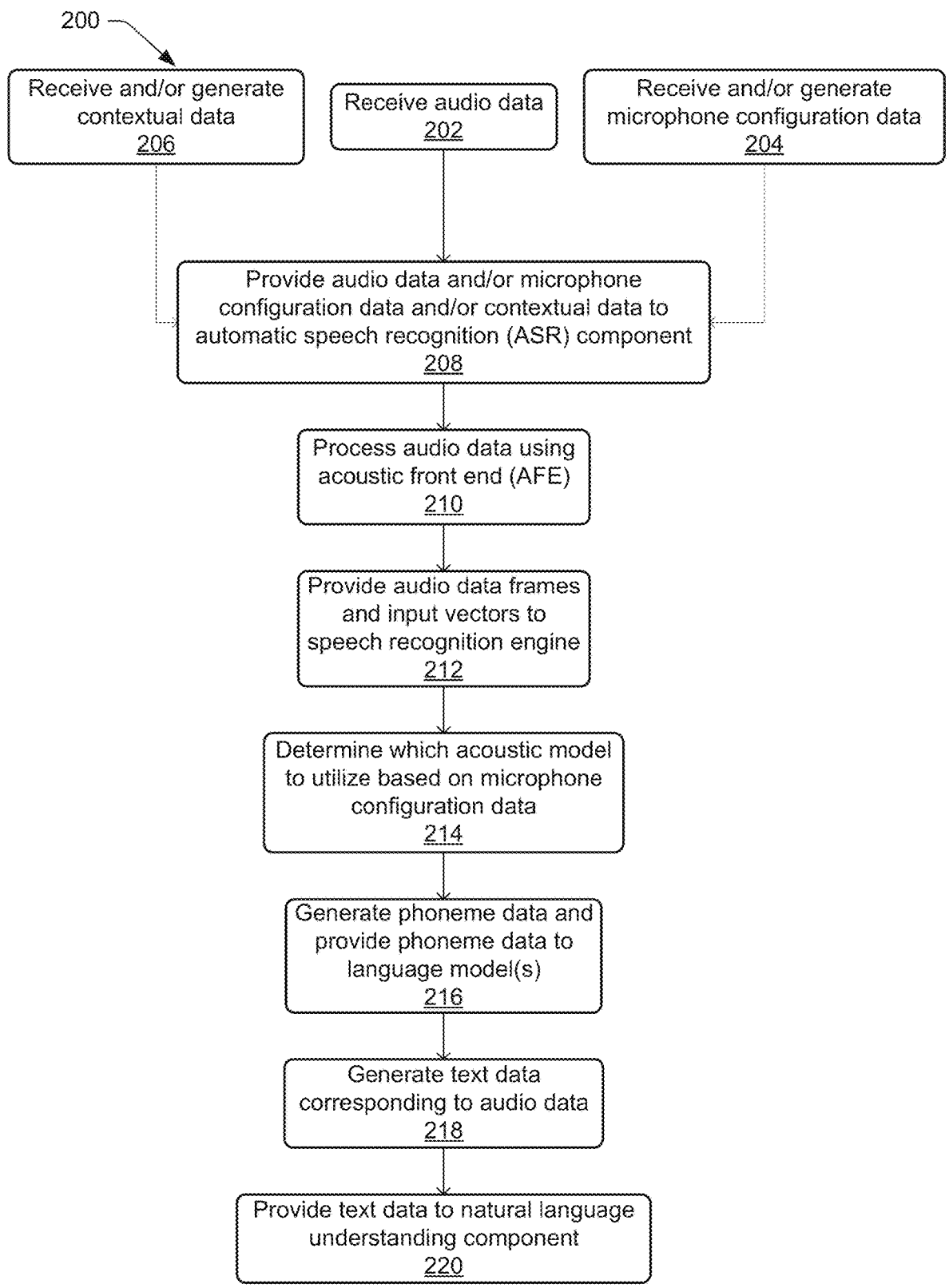
FIG. 2 illustrates a flow diagram of an example process for utilizing microphone array information for acoustic modeling.
Figure 3:
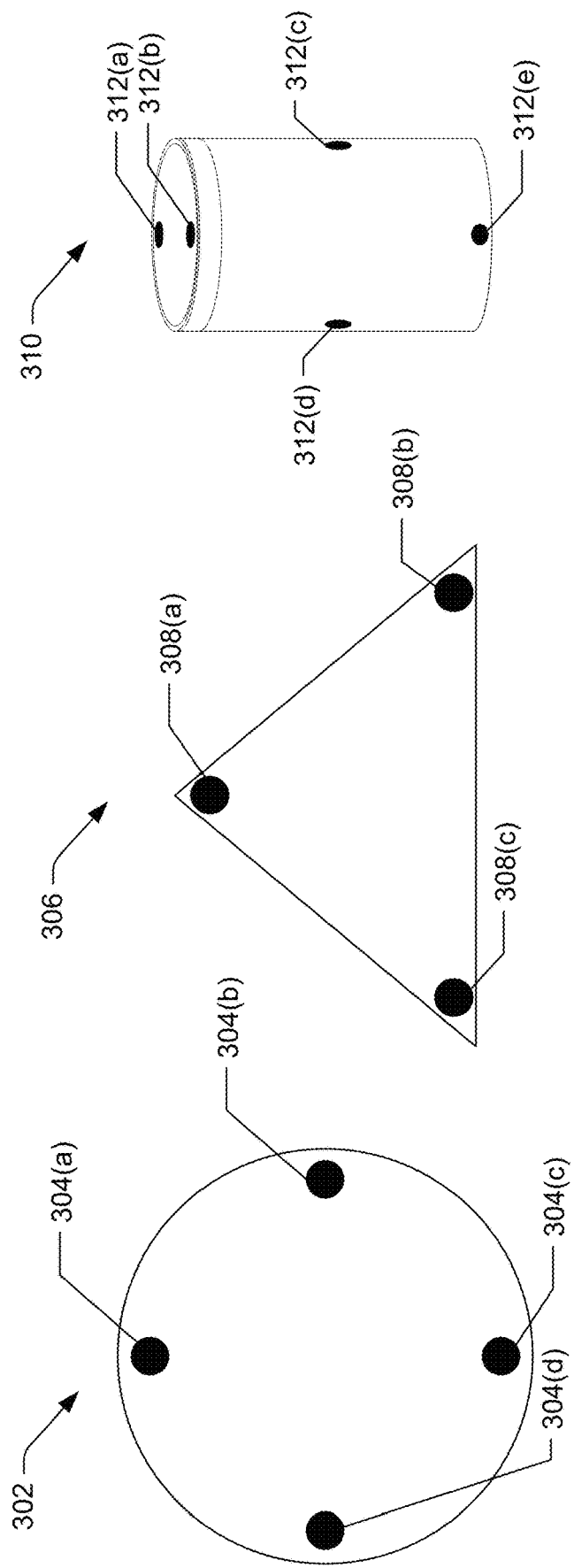
FIG. 3A illustrates a top view of an example device with a microphone array configured in an example geometry.
FIG. 3B illustrates a top view of another example device with a microphone array configured in another example geometry.
FIG. 3C illustrates a perspective view of another example device with a microphone array configured in another example geometry.

FIG. 2 illustrates a process for utilizing microphone array information for acoustic modeling. The process described herein is illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the process is described with reference to the environments, architectures and systems described in the examples herein, such as, for example those described with respect to FIGS. 1 and 3-5, although the process may be implemented in a wide variety of other environments, architectures and systems.

FIG. 2 illustrates a flow diagram of an example process for utilizing microphone array information for acoustic modeling. The order in which the operations or steps are described is not intended to be construed as a limitation, and any number of the described operations may be combined in any order and/or in parallel to implement process 200.

At block 202, process 200 may include receiving audio data. For example, the audio data may be received from a device that includes a microphone array having a certain microphone array configuration. The microphones of the microphone array may capture audio corresponding to a user utterance and may generate corresponding audio data. In examples, the device may utilize beamforming techniques to optimize the audio data before it is further processed. In these examples, the audio data that is received may represent a single, optimized audio signal. In other examples, such as when the device does not utilize beamforming or other signal optimizing techniques, the audio data may be received as a multi-channel input.

At block 204, the process 200 may include receiving and/or generating microphone configuration data. For example, microphone configuration data may be provided by the developer of the device, and that data may be stored in a microphone configuration data component of the memory of the device. In other examples, while microphone configuration data may not be provided by the developer of the device, one or more attributes of the microphones may be described and/or encoded. Information indicating these attributes may be identified, determined, and/or stored. The device may be queried or otherwise utilized to obtain the microphone configuration data and provide the microphone configuration data to the remote system. As described herein, microphone configuration data may include microphone array metadata, which may not include the audio data. Additionally, or alternatively, calibration of the microphone configuration data may be performed, and in these examples, calibration data may be identified, determined, and/or generated. Calibration may include calibration of values for phase and/or gain associated with the microphone array.

At block 206, the process 200 may include receiving and/or generating contextual data. Contextual data may be identified, determined, generated, and/or stored and may indicate contextual information associated with the device. For example, the contextual data may include global positioning data indicating a global positioning location of the device from which the audio data is received. The global positioning data may include global positioning coordinates and/or one or more descriptions of the global positioning location of the device, such as a street address, a city identification, a county identification, a state identification, and/or a country identification. Additionally, or alternatively, the contextual data may include device location data indicating a location and/or position of the device with respect to a given environment. For example, the device location data may indicate that the device is located in a specific room of a home or an office. The device location data may additionally, or alternatively, indicate the location of the device relative to one or more objects in and/or of the environment. For example, the device location data may indicate that the device is situated near a wall, near a source of background noise such as a sink, refrigerator, or television, near a ceiling, near a floor, and/or near a window. The location of the device with respect to its environment may affect the audio captured by the microphones of the device, and as such, the device location data may be utilized to account for the location of the device when speech processing is performed.

Additionally, or alternatively, the contextual data may include speaker location data indicating a location or relative location of a speaker with respect to the device. For example, the speaker location data may indicate that the speaker is a certain distance or within a distance range of the device and/or that the speaker is positioned nearer to one of the microphones than to other microphones in the microphone array. The contextual data may be identified, determined, and/or generated by the device and/or the speech processing system.

At block 208, the process 200 may include providing the audio data, and/or the microphone configuration data, and/or the contextual data to an automatic speech recognition (ASR) component of a system. In examples where the device utilizes techniques to optimize the audio data before sending the optimized audio data to the remote system, this optimized audio data may be provided to the ASR component. In other examples, where the device does not utilize techniques to optimize the audio data, the audio data may be optimized by the speech processing system, such as by noise and echo cancellation, beamforming of multi-channel signals, and/or other optimization techniques. In examples where microphone configuration data is received and/or generated, the microphone configuration data may be encoded as an input vector to the ASR component. The encoding may comprise, for example, identifying, determining, and/or generating one or more representations of the microphone configuration data, such as numerical and/or textual representations, that may be utilized by the acoustic models. In examples where contextual data is received and/or generated, the contextual data may be encoded as another input vector to the ASR component. Encoding of the contextual information may be performed in the same or a similar fashion as encoding of the microphone configuration data.

At block 210, the process 200 may include processing the audio data via an acoustic front end (AFE) component of the ASR component. The AFE component may transform the audio data from the microphone into speech recognition data for processing by a speech recognition engine. The AFE component may reduce noise in the audio data and divide the digitized audio data into frames, also described herein as audio data frames, representing time intervals for which the AFE component determines a number of values, called features, representing the qualities of the audio data, along with a set of those values, called a feature vector and/or an input vector, representing the features/qualities of the audio data within the frame. Many different features may be determined, and each feature represents some quality of the audio that may be useful for ASR processing.

At block 212, the process 200 may include providing audio data frames and one or more input vectors to a speech recognition engine of the ASR component. For example, the audio data frames may include the audio data frames generated and/or identified with respect to block 210, above. By way of further example, the input vectors may include the microphone array input vector and/or the contextual input vector described with respect to block 208, above.

At block 214, the process 200 may include determining which acoustic model to utilize based at least in part on the microphone configuration data. The remote system may be configured to select an acoustic model of multiple acoustic models to perform speech recognition. The remote system may select the acoustic model based at least in part on the microphone configuration data. For example, the acoustic models may be configured and/or trained to process speech-recognition requests from devices with various microphone array configurations. For example, a first acoustic model may be configured and/or trained to process requests from devices with one of a first set of microphone array configurations. A second acoustic model, for example, may be configured and/or training to process requests from devices with one of a second set of microphone array configurations. Based at least in part on the microphone configuration data, the remote system may analyze the microphone array configuration of the device from which the audio data was received and determine the acoustic model configured to process requests from devices with microphone arrays that match or most closely match the microphone array configuration in question.

At block 216, the process 200 may include generating phoneme data based at least in part on the audio data frames and the input vectors. For example, a speech recognition engine of the remote system may process the output from the AFE component along with input vectors with reference to information stored in the acoustic models. Alternatively, post front-end processed data, such as feature vectors, may be received by the device executing ASR processing from another source besides the internal AFE. For example, the user device may process audio data into feature vectors, for example using an on-device AFE, and transmit that information to the remote system.

The speech recognition engine may attempt to match received feature vectors to language phonemes and words as known in the selected acoustic model or language models. The speech recognition engine may compute recognition scores for the feature vectors based on acoustic information, language information, and the microphone array input vector. The acoustic information is used to calculate an acoustic score representing a likelihood that the intended sound represented by a group of feature vectors matches a language phoneme. The microphone array input vector and/or the contextual input vector may be utilized to modify the features vectors, modify the association of the feature vectors to the phonemes, and/or to modify the likelihood that the intended sound represented by the group of feature vectors matches a language phoneme. Phoneme data may be generated that correlates the audio data with phonemes.

The process 200, at block 216, may additionally include providing phoneme data to one or more language models. The language models may be used to adjust the acoustic score by considering what sounds and/or words are used in context with each other, thereby improving the likelihood that the ASR process will output speech results that make sense grammatically. The specific models used may be general models or may be models corresponding to a particular microphone array configuration or set of microphone array.

At block 218, the process 200 may include generating text data corresponding to the audio data. The text data may represent an ordered list of words determined to make up the user utterance.

At block 220, the process 200 may include providing the text data to a natural language understanding (NLU) component of the system. The NLU component may utilize the text data generated by the ASR component to determine intent data representing an intent of the user utterance. NLU techniques are described in more detail with respect to FIG. 5, below.

While not illustrated, the process 200 may additionally, or alternatively, include, training one or more of the acoustic models based at least in part on the microphone configuration data. Training, or otherwise updating, of the acoustic model(s) may include augmenting and/or modifying the association of phonemes to audio data frames. For example, such augmentation and/or modification may include augmenting and/or modifying correlations between attributes of audio data, such as frequencies and/or their amplitudes and/or phases, and phonemes, augmenting and/or modifying portions of the neural network of the acoustic model, and/or modifying and/or augmenting confidences that given audio data frames and/or their audio attributes correlate to a given phoneme.

Additionally, or alternatively, the process 200 may include generating one or more acoustic models based at least in part on the microphone configuration data. Generation of acoustic models may be performed in a similar fashion as training of preexisting acoustic models. For example, correlations between attributes of audio data, such as frequencies and/or their amplitudes and/or phases, and phonemes may be generated, the neural network, or portions thereof, may be generated, and/or confidences that given audio data frames and/or their audio attributes correlate to a given phoneme may be identified and/or determined. Additionally, the training of acoustic models and/or the generating of acoustic models may be performed outside the operations of dealing with particular audio data, such as the audio data received at block 202. Generation of an acoustic model may include, in addition to or alternatively from that described above, generating a transform of an existing acoustic model.

FIG. 3A illustrates a top view of an example device with a microphone array configured in an example geometry. The device 302 may be the same as or similar to the device 102 from FIG. 1. Additionally, or alternatively, the device 302 may include the same or similar components and/or may perform the same or similar functions as the device 102 from FIG. 1. The device 302 may have a first microphone array configuration. As illustrated in FIG. 3A, the microphone array configuration may include indications of the type of microphones, the number of microphones, the spacing between microphones, and/or the locations of the microphones with respect to each other and/or with respect to other components of the device 302. FIG. 3A, for example, illustrates a microphone array configuration of four microphones 304(a)-(d). As illustrated, the microphones 304(a)-(d) are spaced about equal distances from each other and the microphones 304(a)-(d) are arranged in a square geometry with each microphone 304(a)-(d) located at a corner of the square geometry. Additionally, the microphones 304(a)-(d) are located at a top portion of the device 302 such that other components of the device 302 are located between the microphones 304(a)-(d) and a bottom portion of the device 302.

FIG. 3B illustrates a top view of another example device with a microphone array configured in another example geometry. The device 306 may be the same as or similar to the device 102 from FIG. 1. Additionally, or alternatively, the device 306 may include the same or similar components and/or may perform the same or similar functions as the device 102 from FIG. 1. The device 306 may have a second microphone array configuration. As illustrated in FIG. 3B, the microphone array configuration may include indications of the type of microphones, the number of microphones, the spacing between microphones, and/or the locations of the microphones with respect to each other and/or with respect to other components of the device 306. FIG. 3B, for example, illustrates a microphone array configuration of three microphones 308(a)-(c). As illustrated, the microphones 308(a)-(c) are spaced about equal distances from each other and the microphones 308(a)-(c) are arranged in a triangular geometry with each microphone 308(a)-(c) located at a corner of the triangular geometry. Additionally, the microphones 308(a)-(c) are located at a top portion of the device 306 such that other components of the device 306 are located between the microphones 308(a)-(c) and a bottom portion of the device 306. As can be seen from FIGS. 3A and 3B, the microphone array configuration of the device 302 from FIG. 3A may differ in some or all respects with the microphone array configuration of the device 306 from FIG. 3B. Given the differences in the microphone array configurations, a user utterance captured by the microphones 304(a)-(d) and the microphones 308(a)-(c) may be the same user utterance, but the audio data generated by the microphones may differ in one or more audio attributes.

FIG. 3C illustrates a perspective view of another example device with a microphone array configured in another example geometry. The device 310 may be the same as or similar to the device 102 from FIG. 1. Additionally, or alternatively, the device 310 may include the same or similar components and/or may perform the same or similar functions as the device 102 from FIG. 1. The device 310 may have a third microphone array configuration. As illustrated in FIG. 3C, the microphone array configuration may include indications of the type of microphones, the number of microphones, the spacing between microphones, and/or the locations of the microphones with respect to each other and/or with respect to other components of the device 310. FIG. 3C, for example, illustrates a microphone array configuration of five microphones 312(a)-(e). As illustrated, the microphones 312(a)-(e) are spaced at various distances from each other and the microphones 312(a)-(e) are arranged in a three-dimensional geometry with each microphone 312(a)-(e) located at a portion of a surface of the cylindrically-shaped device 310. Additionally, a portion of the microphones 312(a)-(b) are located at a top portion of the device 310, while another portion of the microphones 312(c)-(e) are located on a side of the device 310. Additionally, the microphones 312(a)-(d) have a first shape while the microphone 312(e) has a second shape. As can be seen from FIGS. 3A and 3C, the microphone array configuration of the device 302 from FIG. 3A may differ in some or all respects with the microphone array configuration of the device 310 from FIG. 3C. Given the differences in the microphone array configurations, a user utterance captured by the microphones 304(a)-(d) and the microphones 312(a)-(e) may be the same user utterance, but the audio data generated by the microphones may differ in one or more audio attributes.

Figure 4:
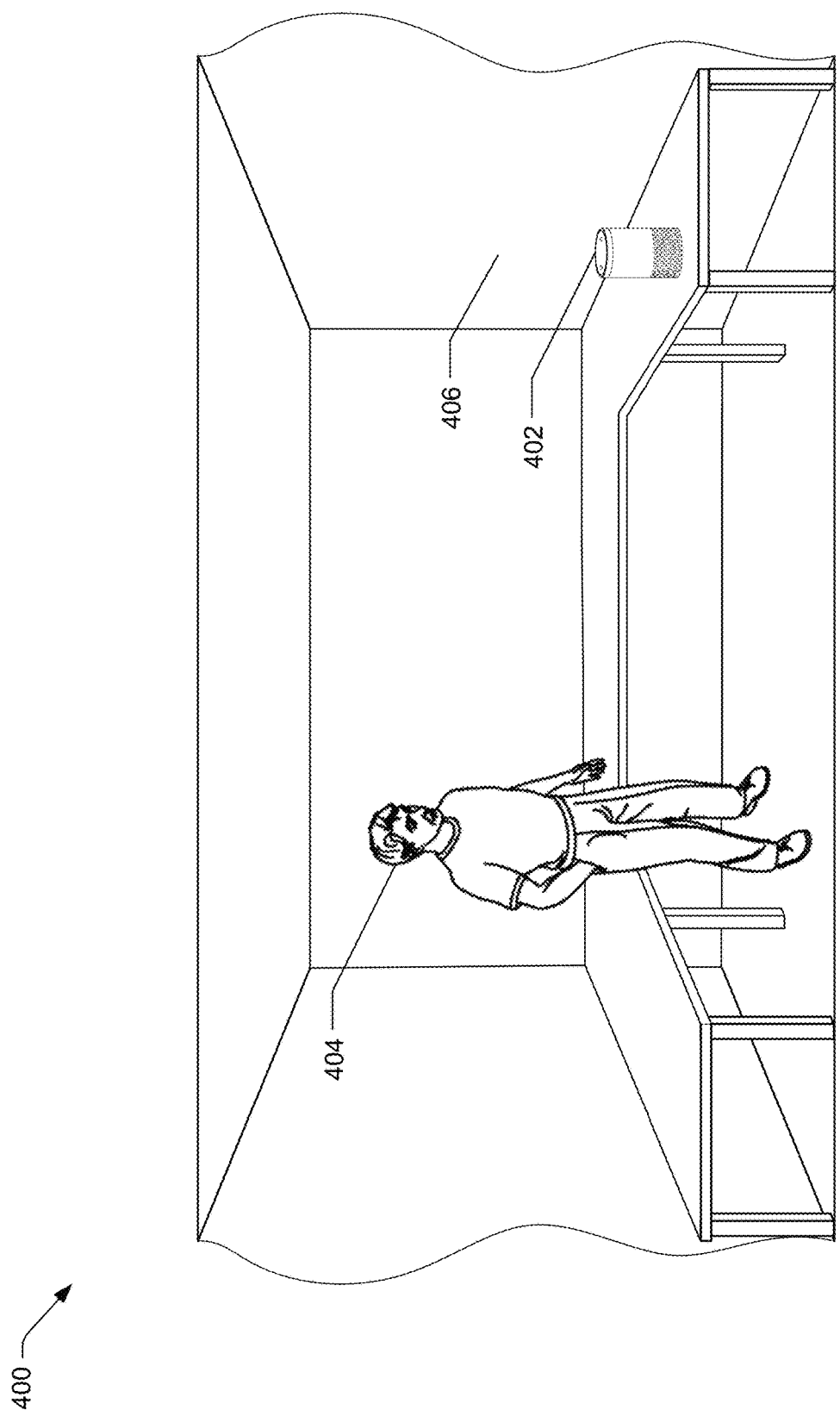
FIG. 4 illustrates an example environment including a device having a microphone array from which contextual data associated with the locations of the device, a user, and/or the environment may be obtained.

FIG. 4 illustrates an example environment 400 including a device 402 having a microphone array from which contextual data associated with the locations of the device, a user, and/or the environment may be obtained. The device 402 may be the same as or similar to the device 102 described with respect to FIG. 1. Additionally, or alternatively, the device 402 may include the same or similar components and/or may perform the same or similar functions as the device 102 from FIG. 1.

In examples, a user 404 present in the environment 400 may speak a user utterance. The microphones of the device 402 may capture audio corresponding to the user utterance and may generate audio data, as described herein. In addition to the microphone array configuration impacting attributes of the audio data, other environmental factors may also impact attributes of the audio data. For example, the type of environment in which the device 402 is disposed, the location of the device 402 in the environment, and/or a location of the user 404 with respect to the device 402 may impact attributes of the audio data. Identifying these environmental conditions may assist in processing the audio data and performing automatic speech recognition.

The device 402 and/or a remote system may be configured to identify, determine, generate, and/or store contextual data indicating contextual information associated with the device 402. For example, the contextual data may include global positioning data indicating a global positioning location of the device 402. The global positioning data may include global positioning coordinates and/or one or more descriptions of the global positioning location of the device 402, such as a street address, a city identification, a county identification, a state identification, and/or a country identification. The global positioning data may also indicate if the device is stationary, such as when disposed within a home, or when the device is moving, such as when disposed within and/or as part of an automobile.

Additionally, or alternatively, the contextual data may include device location data indicating a location and/or position of the device 402 with respect to a given environment. For example, the device location data may indicate that the device 402 located in a specific room of a home or an office. The device location data may additionally, or alternatively, indicate the location of the device 402 relative to one or more objects in and/or of the environment. For example, the device location data may indicate that the device 402 is situated near a wall 406, near a source of background noise such as a sink, refrigerator, or television, near a ceiling, near a floor, and/or near a window. The location of the device 402 with respect to its environment may affect the audio captured by the microphones of the device 402, and as such, the device location data may be utilized to account for the location of the device 402 when speech processing is performed.

Additionally, or alternatively, the contextual data may include speaker location data indicating a location or relative location of the user 404 with respect to the device 402. For example, the speaker location data may indicate that the user 404 is a certain distance or within a distance range of the device 402 and/or that the user 404 is positioned nearer to one of the microphones than to other microphones in the microphone array.

Additionally, or alternatively, the contextual data may include device-state data, which may indicate a state of the device from which the audio data was received. For example, a device may be in one or more states. The states, by way of example and not as a limitation, may include an "on" state, an "off" state, a "standby" state, a "playing music" state, an "audio-output" state, etc. Metadata indicating the state of the device may be identified, determined, and/or generated and may be sent to the remote system to assist in speech processing.

Figure 5:
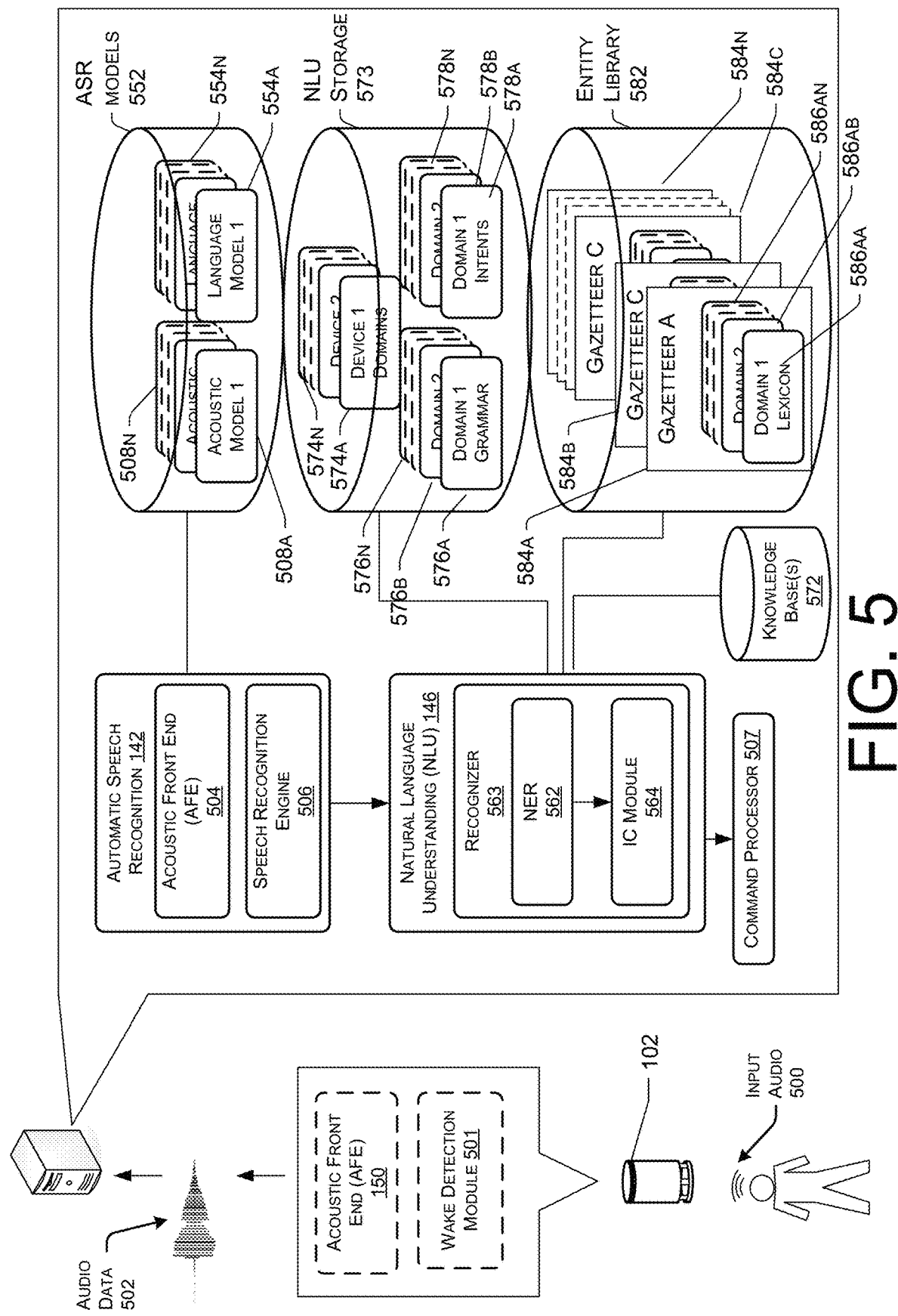
FIG. 5 illustrates a conceptual diagram of components of a speech processing system for processing audio data provided by one or more devices.

FIG. 5 illustrates a conceptual diagram of how a spoken utterance can be processed, allowing a system to capture and execute commands spoken by a user, such as spoken commands that may follow a wakeword, or trigger sound, (i.e., a predefined word, phrase, or sound for "waking" a device, causing the device to begin sending audio data to a remote system, such as system 106). The various components illustrated may be located on a same or different physical devices. Communication between various components illustrated in FIG. 5 may occur directly or across a network 128. An audio capture component, such as a microphone 104 of the device 102, or another device, captures audio 500 corresponding to a spoken utterance. The device 102, using a wakeword detection module 501, also described herein as a trigger-sound component 118, then processes audio data corresponding to the audio 500 to determine if a keyword (such as a wakeword) is detected in the audio data. Following detection of a wakeword, the device 102 sends audio data 502 corresponding to the utterance to the remote system 106 that includes an ASR component 142. The audio data 502 may be output from an optional acoustic front end (AFE) 504 located on the device prior to transmission. In other instances, the audio data 502 may be in a different form for processing by a remote AFE 504, such as the AFE 504 located with the ASR component 142 of the remote system 106.

The wakeword detection module 501 works in conjunction with other components of the user device, for example a microphone to detect keywords in audio 500. For example, the device may convert audio 500 into audio data, and process the audio data with the wakeword detection module 501 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection module 501 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 501 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 502 corresponding to input audio 500 to the remote system 106 for speech processing. Audio data corresponding to that audio may be sent to remote system 106 for routing to a recipient device or may be sent to the remote system 106 for speech processing for interpretation of the included speech (either for purposes of enabling voice-communications and/or for purposes of executing a command in the speech). The audio data 502 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 106, an ASR component 142 may convert the audio data 502 into text. The ASR transcribes audio data into text data representing the words of the speech contained in the audio data 502. The text data may then be used by other components for various purposes, such as executing system commands, inputting data, etc. A spoken utterance in the audio data is input to a processor configured to perform ASR which then interprets the utterance based on the similarity between the utterance and pre-established language models 554 stored in an ASR model knowledge base (ASR Models Storage 552). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 508 stored in an ASR Models Storage 552), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 142 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 504 and a speech recognition engine 506. The acoustic front end (AFE) 504 transforms the audio data from the microphone into data for processing by the speech recognition engine 506. The speech recognition engine 506 compares the speech recognition data with acoustic models 508, language models 554, and other data models and information for recognizing the speech conveyed in the audio data. The AFE 504 may reduce noise in the audio data and divide the digitized audio data into frames representing time intervals for which the AFE 504 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 506 may process the output from the AFE 504 with reference to information stored in speech/model storage (552). Alternatively, post front-end processed data (such as feature vectors) may be received by the device executing ASR processing from another source besides the internal AFE. For example, the user device may process audio data into feature vectors (for example using an on-device AFE 504) and transmit that information to a server across a network for ASR processing. Feature vectors may arrive at the remote system 106 encoded, in which case they may be decoded prior to processing by the processor executing the speech recognition engine 506.

The speech recognition engine 506 attempts to match received feature vectors to language phonemes and words as known in the stored acoustic models 508 and language models 554. The speech recognition engine 506 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, play Song A." The wake detection module 501 may identify the wake word, otherwise described as a trigger sound, "Alexa" in the user utterance and may "wake" based on identifying the wake word. Audio data corresponding to the user utterance may be sent to the remote system 106 where the speech recognition engine 506 may identify, determine, and/or generate text data corresponding to the user utterance, here "play Song A."

The speech recognition engine 506 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 506 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 146 (e.g., server 106) may include various components, including potentially dedicated processor(s), memory, storage, etc. As shown in FIG. 5, an NLU component 146 may include a recognizer 563 that includes a named entity recognition (NER) module 562 which is used to identify portions of query text that correspond to a named entity that may be recognizable by the system. A downstream process called named entity resolution links a text portion to a specific entity known to the system. To perform named entity resolution, the system may utilize gazetteer information (584*a*-584*n*) stored in entity library storage 582. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 142 based on the utterance input audio 500) and attempts to make a semantic interpretation of the text. That is, the NLU process determines the meaning behind the text based on the individual words and then implements that meaning. NLU processing 146 interprets a text string to derive an intent or a desired action from the user as well as the pertinent pieces of information in the text that allow a device (e.g., device 102) to complete that action. For example, if a spoken utterance is processed using ASR 146 and outputs the text "play Song A" the NLU process may determine that the user intended for the device 102 to output or cause to be output audio corresponding to the song "Song A."

The NLU may process several textual inputs related to the same utterance. For example, if the ASR 146 outputs N text segments (as part of an N-best list), the NLU may process all N outputs to obtain NLU results.

As will be discussed further below, the NLU process may be configured to parse and tag to annotate text as part of NLU processing. For example, for the text "play Song A," "play" may be tagged as a command (to output audio on a device) and "Song A" may be tagged as an audio file designator, here a song, associated with an audio file.

To correctly perform NLU processing of speech input, an NLU process 146 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 562 receives a query in the form of ASR results and attempts to identify relevant grammars and lexical information that may be used to construe meaning. To do so, the NLU module 146 may begin by identifying potential domains that may relate to the received query. The NLU storage 573 includes a database of devices (574*a*-574*n*) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 563, language model and/or grammar database (576*a*-576*n*), a particular set of intents/actions (578*a*-578*n*), and a particular personalized lexicon (586). Each gazetteer (584*a*-584*n*) may include domain-indexed lexical information associated with a particular user and/or device. For example, the Gazetteer A (584*a*) includes domain-index lexical information 586*aa* to 586*an*. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (IC) module 564 parses the query to determine an intent or intents for each identified domain, where the intent corresponds to the action to be performed that is responsive to the query. Each domain is associated with a database (578*a*-578*n*) of words linked to intents. For example, a music intent database may link words and phrases such as "add," "move," "remove," "quiet," "volume off;" and "mute" to a "mute" intent. A voice-message intent database, meanwhile, may link words and phrases such as "send a message," "send a voice message," "send the following," or the like. The IC module 564 identifies potential intents for each identified domain by comparing words in the query to the words and phrases in the intents database 578. In some instances, the determination of an intent by the IC module 564 is performed using a set of rules or templates that are processed against the incoming text to identify a matching intent.

In order to generate a particular interpreted response, the NER 562 applies the grammar models and lexical information associated with the respective domain to actually recognize a mention of one or more entities in the text of the query. In this manner, the NER 562 identifies "slots" or values (i.e., particular words in query text) that may be needed for later command processing. Depending on the complexity of the NER 562, it may also label each slot with a type of varying levels of specificity (such as noun, place, city, artist name, song name, device identification, audio identification, audio-session queue identification, or the like). Each grammar model 576 includes the names of entities (i.e., nouns) commonly found in speech about the particular domain (i.e., generic terms), whereas the lexical information 586 from the gazetteer 584 is personalized to the user(s) and/or the device. For instance, a grammar model associated with the shopping domain may include a database of words commonly used when people discuss shopping.

The intents identified by the IC module 564 are linked to domain-specific grammar frameworks (included in 576)

with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "play Song A" is an identified intent, a grammar (576) framework or frameworks may correspond to sentence structures such as "play {Song A} on {Device 1}."

For example, the NER module 562 may parse the query to identify words as subject, object, verb, preposition, etc., based on grammar rules and/or models, prior to recognizing named entities. The identified verb may be used by the IC module 564 to identify intent, which is then used by the NER module 562 to identify frameworks. A framework for the intent of "play a song," meanwhile, may specify a list of slots/fields applicable to play the identified "song" and any object modifier (e.g., specifying a music collection from which the song should be accessed) or the like. The NER module 562 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 562 may search the database of generic words associated with the domain (in the knowledge base 572). So, for instance, if the query was "play Song A," after failing to determine which audio file corresponds to "Song A," the NER component 562 may search the domain vocabulary for song titles associated with the phrase "Song A." In the alternative, generic words may be checked before the gazetteer information, or both may be tried, potentially producing two different results.

The output data from the NLU processing (which may include tagged text, commands, etc.) may then be sent to a command processor 507. The destination command processor 507 may be determined based on the NLU output. For example, if the NLU output includes a command to send a message, the destination command processor 507 may be a message sending application, such as one located on the user device or in a message sending appliance, configured to execute a message sending command. If the NLU output includes a search request, the destination command processor 507 may include a search engine processor, such as one located on a search server, configured to execute a search command. After the appropriate command is generated based on the intent of the user, the command processor 507 may provide some or all of this information to a text-to-speech (TTS) engine. The TTS engine may then generate an actual audio file for outputting the audio data determined by the command processor 507 (e.g., "playing music"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 146 during runtime operations where NLU operations are performed on text (such as text output from an ASR component 142). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 563. Each recognizer may include various NLU components such as an NER component 562, IC module 564 and other components such as an entity resolver, or other components.

For example, a messaging domain recognizer 563-A (Domain A) may have an NER component 562-A that identifies what slots (i.e., portions of input text) may correspond to particular words relevant to that domain. The words may correspond to entities such as (for the messaging domain) a recipient. An NER component 562 may use a machine learning model, such as a domain specific conditional random field (CRF) to both identify the portions corresponding to an entity as well as identify what type of entity corresponds to the text portion. The messaging domain recognizer 563-A may also have its own intent classification (IC) component 564-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 116 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 6:
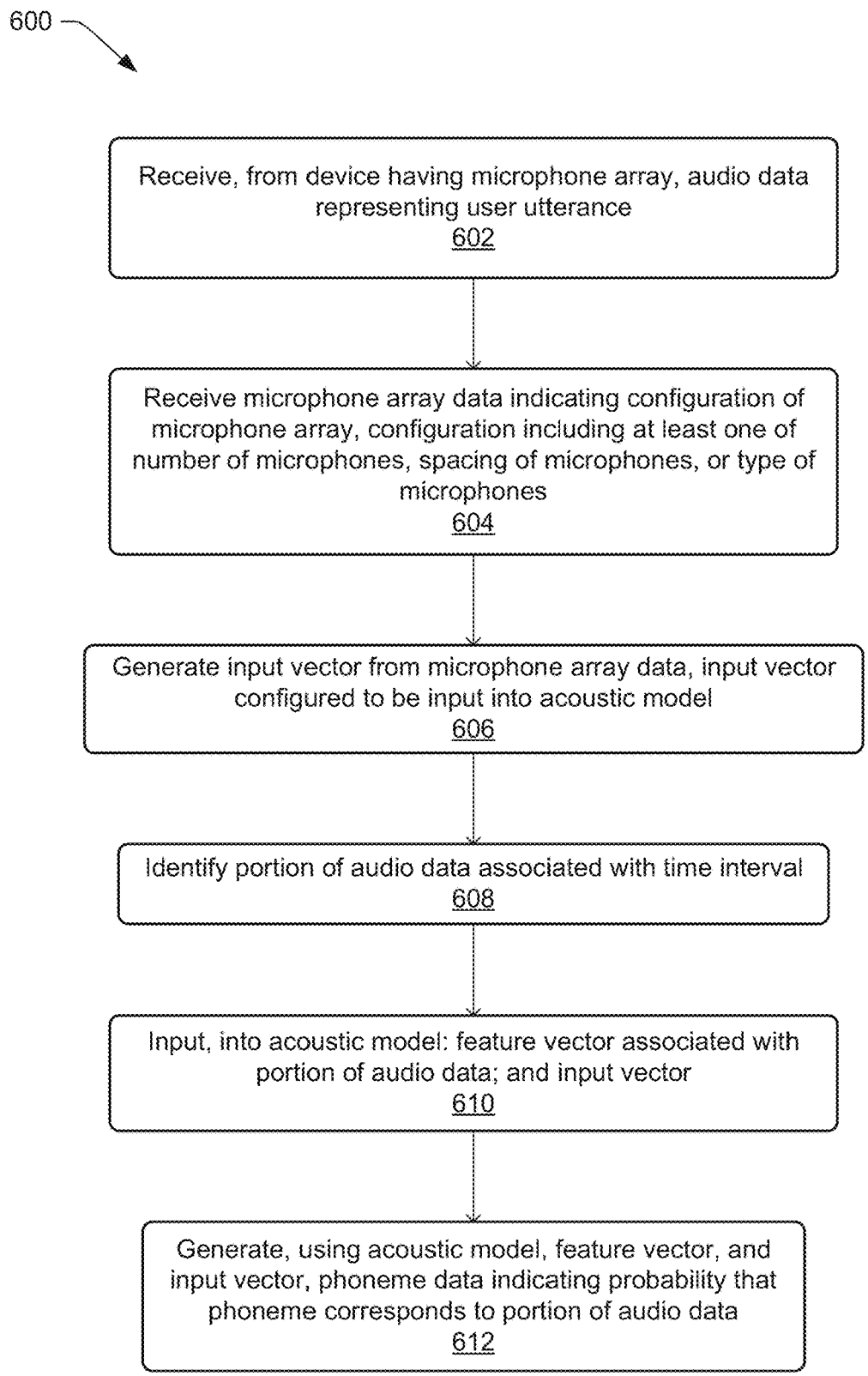
FIG. 6 illustrates a flow diagram of an example process for utilizing microphone array information as an input vector to an acoustic model.
Figure 7:
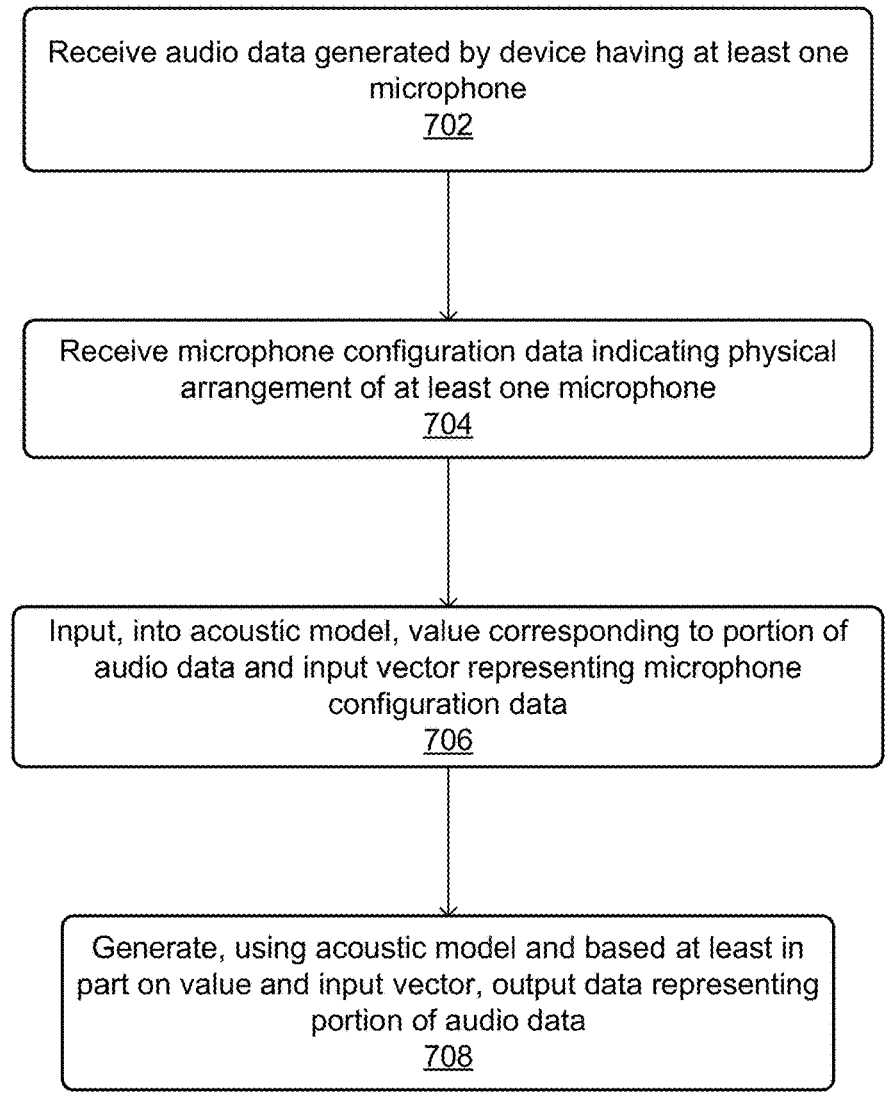
FIG. 7 illustrates a flow diagram of another example process for utilizing microphone array information as an input vector to an acoustic model.
Figure 8:
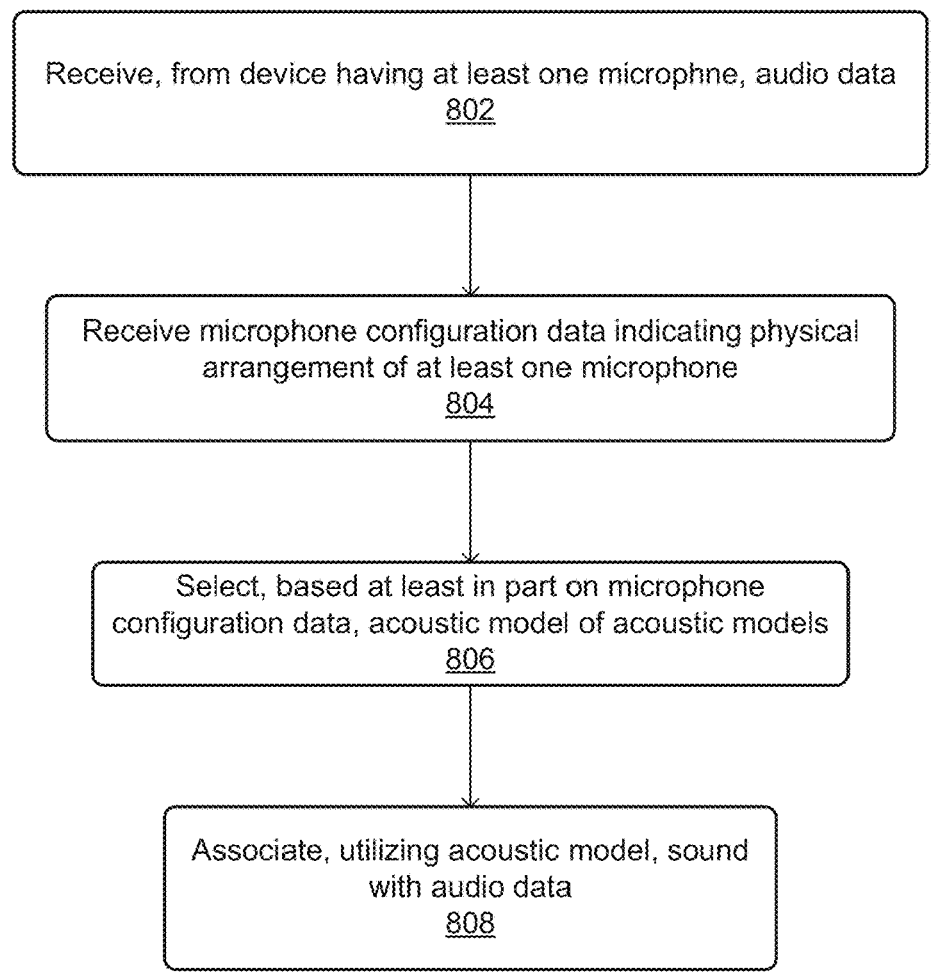
FIG. 8 illustrates a flow diagram of an example process for selecting an acoustic model based on microphone array information.

FIGS. 6-8 illustrate various processes for utilizing microphone array information for acoustic modeling. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted.

Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 3-5, although the processes may be implemented in a wide variety of other environments, architectures and systems.

FIG. 6 illustrates a flow diagram of an example process 600 for utilizing microphone array information for acoustic modeling. The order in which the operations or steps are described is not intended to be construed as a limitation, and any number of the described operations may be combined in any order and/or in parallel to implement process 600.

At block 602, process 600 may include receiving, from a device having a microphone array, audio data representing a user utterance. For example, the audio data may be received from a device that includes a microphone array having a certain microphone array configuration. The microphones of the microphone array may capture audio corresponding to the user utterance and may generate corresponding audio data. In examples, the device may utilize beamforming techniques to optimize the audio data before it is further processed. In these examples, the audio data that is received may represent a single, optimized audio signal. In other examples, such as when the device does not utilize beamforming or other signal optimizing techniques, the audio data may be received as a multi-channel input.

At block 604, the process 600 may include receiving microphone configuration data indicating a configuration of the microphone array, the configuration including at least one of a number of microphones, a spacing of the microphones, or a type of the microphones. For example, microphone configuration data may be provided by the developer of the device, and that data may be stored in a microphone configuration data component of the memory of the device. In other examples, while microphone configuration data may not be provided by the developer of the device, one or more attributes of the microphones may be described and/or encoded. Information indicating these attributes may be identified, determined, and/or stored. The device may be queried or otherwise utilized to obtain the microphone configuration data and provide the microphone configuration data to the remote system. In examples, one or more database not situated on memory of the device may be queried and/or accessed to identify the microphone configuration data.

At block 606, the process 600 may include generating an input vector from the microphone configuration data, the input vector configured to be input into an acoustic model. The encoding may comprise, for example, identifying, determining, and/or generating one or more representations of the microphone configuration data, such as numerical and/or textual representations, that may be utilized by the acoustic models.

At block 608, the process 600 may include identifying a portion of the audio data associated with a time interval. The audio data may be segmented into portions or "frames," which represent a portion of the audio data associated with a time interval. For each frame, the attributes of the audio data may be analyzed by a speech recognition engine, such as by utilizing one or more acoustic models, to determine a phoneme that most likely corresponds to the frame of the audio data. For example, each frame of the audio data may be associated with one or more audio frequencies, and each frequency may have an amplitude and phase. An acoustic front end component may reduce noise in the audio data and divide the digitized audio data into the frames, also described herein as audio data frames, representing time intervals for which the AFE component determines a number of values, called features, representing the qualities of the audio data, along with a set of those values, called a feature vector and/or an input vector, representing the features/qualities of the audio data within the frame. Many different features may be determined, and each feature represents some quality of the audio that may be useful for ASR processing.

At block 610, the process 600 may include inputting, into the acoustic model, a feature vector associated with the portion of the audio data and the input vector. For example, the feature vector corresponding to the frame of the audio data may include the feature vector generated and/or identified with respect to block 608, above. By way of further example, the input vector may include the microphone array input vector and/or a contextual input vector described herein.

The remote system may be configured to select an acoustic model of multiple acoustic models to perform speech recognition. The remote system may select the acoustic model based at least in part on the microphone configuration data. For example, the acoustic models may be configured and/or trained to process speech-recognition requests from devices with various microphone array configurations. For example, a first acoustic model may be configured and/or trained to process requests from devices with one of a first set of microphone array configurations. A second acoustic model, for example, may be configured and/or training to process requests from devices with one of a second set of microphone array configurations. Based at least in part on the microphone configuration data, the remote system may analyze the microphone array configuration of the device from which the audio data was received and determine the acoustic model configured to process requests from devices with microphone arrays that match or most closely match the microphone array configuration in question.

At block 612, the process 600 may include generating, using the acoustic model and based on the input vector and the feature vector, phoneme data indicating a probability that a phoneme corresponds to the portion of the audio data. For example, a speech recognition engine of the remote system may process the output from the AFE component along with input vectors with reference to information stored in the acoustic models. Alternatively, post front-end processed data, such as feature vectors, may be received by the device executing ASR processing from another source besides the internal AFE. For example, the user device may process audio data into feature vectors, for example using an on-device AFE, and transmit that information to the remote system.

The speech recognition engine may attempt to match received feature vectors to language phonemes and words as known in the selected acoustic model or language models. The speech recognition engine may compute recognition scores for the feature vectors based on acoustic information, language information, and the microphone array input vector. The acoustic information may be used to calculate an acoustic score representing a likelihood that the intended sound represented by a group of feature vectors matches a language phoneme. The microphone array input vector and/or the contextual input vector may be utilized to modify the features vectors, modify the association of the feature vectors to the phonemes, and/or to modify the likelihood that the intended sound represented by the group of feature vectors matches a language phoneme. Phoneme data may be generated that correlates the audio data with phonemes.

The process 600 may additionally, or alternatively, include generating a trigger-sound component configured to transition at least a portion of the device from a first state to a second state when the device determines that a trigger sound has been uttered. The trigger-sound component may be configured to detect the trigger sound using audio data generated by the microphones configured in the physical arrangement. The process 600 may also include sending, to the device, configuration data representing the trigger-sound component for use by the device to detect the trigger sound. Identification of the trigger sound may cause the device to transition from the first state to the second state. For example, the device may be configured, in the first state, to receive user utterances and locally processes the corresponding audio data to determine if a trigger sound, also described as a wake word, has been spoken by a user.

Based at least in part on identifying the trigger sound, the device may be configured, in the second state, to send audio data to the remote system for more robust speech processing. The trigger-sound component may utilize an ASR component of the device to identify a trigger sound in a user utterance. It should be understood that while the trigger-sound component and its functionality has been described herein as a component that controls the state of the device, description of the various functionalities of the device in terms of states is provided by way of example. Alternatively, state transitions may not be utilized and instead functionalities may be utilized or not utilized depending on the identification of a trigger sound by the trigger-sound component. By way of example, the trigger-sound component may identify the trigger sound "Alexa" in the user utterance and may "wake" based on identifying the trigger sound. Audio data corresponding to the user utterance may be sent to the remote system where a speech recognition engine of the remote system may identify, determine, and/or generate text data corresponding to the user utterance, for example.

The configuration data sent from the remote system to the device may modify and/or replace the trigger sound speech processing of the device such that accuracy of trigger sound detection is improved. For example, once the microphone array configuration is determined, that information may be utilized to select an acoustic model for the device to utilize to detect a trigger sound. In other examples, the microphone array information may be encoded as an input vector that is sent to the device to utilize to detect a trigger sound. In other examples, the acoustic model utilized by the device may be trained based at least in part on the configuration data such that at least a portion of the acoustic model, including, for example, the association of audio data frames to phonemes, is augmented and/or altered.

The process 600 may additionally, or alternatively, include analyzing the configuration of the microphone array with respect to reference configurations to determine that the configuration corresponds to one of the reference configurations, which may be associated with a given acoustic model. The process 600 may also include selecting the acoustic model from multiple acoustic models based on the configuration corresponding to the reference configuration. For example, an acoustic model selector may be configured to select an acoustic model of the acoustic models to perform speech recognition. The acoustic model selector may select the acoustic model based at least in part on the microphone configuration data. For example, the acoustic models may be configured and/or trained to process speech-recognition requests from devices with various microphone array configurations. For example, a first acoustic model may be configured and/or trained to process requests from devices with seven microphones in the microphone array with spacing between about one centimeter and about five centimeters. A second acoustic model, for example, may be configured and/or training to process requests from devices with three microphones or four microphones. Based at least in part on the microphone configuration data, the acoustic model selector may analyze the microphone array configuration of the device from which the audio data was received and determine the acoustic model configured to process requests from devices with microphone arrays that match or most closely match the microphone array configuration in question.

The process 600 may additionally, or alternatively, include identifying a first parameter of the acoustic model that is associated with microphone array configurations. The process 600 may also include determining, from the microphone configuration data, that the configuration of the microphone array differs from the microphone array configuration associated with the first parameter and generating a second parameter based on the microphone configuration data. The process 600 may also include causing the first parameter to be replaced by the second parameter.

FIG. 7 illustrates a flow diagram of an example process 700 for utilizing microphone array information for acoustic modeling. The order in which the operations or steps are described is not intended to be construed as a limitation, and any number of the described operations may be combined in any order and/or in parallel to implement process 700.

At block 702, process 700 may include receiving audio data generated by a device having at least one microphone. In examples, the audio data may represent a user utterance. For example, the audio data may be received from a device that includes a microphone array, which may contain one or more microphones, having a certain microphone array configuration. The microphones of the microphone array may capture audio corresponding to the user utterance and may generate corresponding audio data. In examples, the device may utilize beamforming techniques to optimize the audio data before it is further processed. In these examples, the audio data that is received may represent a single, optimized audio signal. In other examples, such as when the device does not utilize beamforming or other signal optimizing techniques, the audio data may be received as a multi-channel input. In other examples, the audio data may not include a user utterance but instead by include another type of sound, such as a mouse "click," a button push, or inaudible sound. The microphones of the microphone array may capture this audio and generate corresponding audio data.

At block 704, the process 700 may include receiving microphone configuration data indicating a physical arrangement of the at least one microphone. For example, microphone configuration data may be provided by the developer of the device, and that data may be stored in a microphone configuration data component of the memory of the device. In other examples, while microphone configuration data may not be provided by the developer of the device, one or more attributes of the microphones may be described and/or encoded. Information indicating these attributes may be identified, determined, and/or stored. The device may be queried or otherwise utilized to obtain the microphone configuration data and provide the microphone configuration data to the remote system. In examples, one or more database not situated on memory of the device may be queried and/or accessed to identify the microphone configuration data. The microphone array configuration may include indications of the type of microphones, the number of microphones, the spacing between microphones, and the locations of the microphones with respect to each other and/or with respect to other components of the device.

At block 706, the process 700 may include inputting, into an acoustic model, a value corresponding to a portion of the audio data and an input vector representing the microphone configuration data. For example, an input vector may be generated from the microphone configuration data. The input vector may be configured to be input into an acoustic model. Generating the input vector may comprise, for example, generating one or more representations of the microphone configuration data, such as numerical and/or textual representations, that may be utilized by the acoustic models.

As to the value, it may be a value associated with one or more characteristics of sound and/or a feature vector. The audio data may be segmented into frames, which may be portions of the audio data associated with a time interval. For example, each frame of the audio data may be associated with one or more audio frequencies, and each frequency may have an amplitude and phase. An acoustic front end component may reduce noise in the audio data and divide the digitized audio data into the frames, also described herein as audio data frames, representing time intervals for which the AFE component determines a number of values, called features, representing the qualities of the audio data, along with a set of those values, called the feature vector and/or an input vector, representing the features/qualities of the audio data within the frame. Many different features may be determined, and each feature represents some quality of the audio that may be useful for ASR processing. Once the value and input vector are determined and/or generated, they may be input into the acoustic model.

The remote system may be configured to select an acoustic model of multiple acoustic models to perform speech recognition. The remote system may select the acoustic model based at least in part on the microphone configuration data. For example, the acoustic models may be configured and/or trained to process speech-recognition requests from devices with various microphone array configurations. For example, a first acoustic model may be configured and/or trained to process requests from devices with one of a first set of microphone array configurations. A second acoustic model, for example, may be configured and/or training to process requests from devices with one of a second set of microphone array configurations. Based at least in part on the microphone configuration data, the remote system may analyze the microphone array configuration of the device from which the audio data was received and determine the acoustic model configured to process requests from devices with microphone arrays that match or most closely match the microphone array configuration in question.

At block 708, the process 700 may include generating, using the acoustic model and based at least in part on the value and the input vector, output data representing the portion of the audio data. The output data may be utilized to determine a probability that a sound corresponds to the portion of the audio data. For example, in instances where the audio data includes a user utterance, a speech recognition engine of the remote system may process the output from the AFE component along with input vectors with reference to information stored in the acoustic models. Alternatively, post front-end processed data, such as feature vectors, may be received by the device executing ASR processing from another source besides the internal AFE. For example, the user device may process audio data into feature vectors, for example using an on-device AFE, and transmit that information to the remote system.

The speech recognition engine may attempt to match received feature vectors to language phonemes and words as known in the selected acoustic model or language models. The speech recognition engine may compute recognition scores for the feature vectors based on acoustic information, language information, and the microphone array input vector. The acoustic information may be used to calculate an acoustic score representing a likelihood that the intended sound represented by a group of feature vectors matches a language phoneme. The microphone array input vector and/or the contextual input vector may be utilized to identify and/or generate features vectors, determine the association of the feature vectors to the phonemes, and/or to determine the likelihood that the intended sound represented by the group of feature vectors matches a language phoneme. In these examples, the output data may include phoneme data that correlates the audio data with phonemes. In examples whether the audio data does not include a user utterance, the output data may include data that correlates the audio data with specific sounds, such as reference sounds that are known to or are otherwise accessible by the remote system.

The process 700 may additionally, or alternatively, include generating a trigger-sound component configured to transition at least a portion of the device from a first state to a second state when the device determines that a trigger sound has been uttered. The trigger-sound component may be configured to detect the trigger sound using audio data generated by the microphones configured in the physical arrangement. The process 700 may also include sending, to the device, configuration data representing the trigger-sound component for use by the device to detect the trigger sound. Identification of the trigger sound may cause the device to transition from the first state to the second state. For example, the device may be configured, in the first state, to receive user utterances and locally processes the corresponding audio data to determine if a trigger sound, also described as a wake word, has been spoken by a user.

Based at least in part on identifying the trigger sound, the device may be configured, in the second state, to send audio data to the remote system for more robust speech processing. The trigger-sound component may utilize an ASR component of the device to identify a trigger sound in a user utterance. It should be understood that while the trigger-sound component and its functionality has been described herein as a component that controls the state of the device, description of the various functionalities of the device in terms of states is provided by way of example. Alternatively, state transitions may not be utilized and instead functionalities may be utilized or not utilized depending on the identification of a trigger sound by the trigger-sound component. By way of example, the trigger-sound component may identify the trigger sound "Alexa" in the user utterance and may "wake" based on identifying the trigger sound. Audio data corresponding to the user utterance may be sent to the remote system where a speech recognition engine of the remote system may identify, determine, and/or generate text data corresponding to the user utterance, for example.

The configuration data sent from the remote system to the device may modify and/or replace the trigger sound speech processing of the device such that accuracy of trigger sound detection is improved. For example, once the microphone array configuration is determined, that information may be utilized to select an acoustic model for the device to utilize to detect a trigger sound. In other examples, the microphone array information may be encoded as an input vector that is sent to the device to utilize to detect a trigger sound. In other examples, the acoustic model utilized by the device may be trained based at least in part on the configuration data such that at least a portion of the acoustic model, including, for example, the association of audio data frames to phonemes, is augmented and/or altered.

The process 700 may additionally, or alternatively, include identifying a first parameter of the acoustic model that is associated with microphone array configurations. The process 700 may also include determining, from the microphone configuration data, that the configuration of the microphone array differs from the microphone array configuration associated with the first parameter and generating a second parameter based on the microphone configuration data. The process 700 may also include causing the first parameter to be replaced by the second parameter.

The process 700 may additionally, or alternatively, include receiving, via the device, global positioning data indicating a location of the device. Additionally, or alternatively, the process 700 may include receiving, via the device, device location data indicating a location of the device within an environment. Additionally, or alternatively, the process 700 may include receiving, via the device, speaker location data indicating a location, relative to the device, of a user that provided the user utterance. In examples, the global positioning data, the device location data, and/or the speaker location data may represent contextual data. The process 700 may also include inputting a second input vector representing the contextual data into the acoustic model. Generation of the output data may be based at least in part on the second input vector. For example, the microphone array input vector and/or the contextual input vector may be utilized to modify the features vectors, modify the associations of the feature vectors to the sounds, and/or to modify the likelihood that the intended sound represented by the group of feature vectors matches a language phoneme and/or sound.

FIG. 8 illustrates a flow diagram of an example process for selecting an acoustic model based on microphone array information. The order in which the operations or steps are described is not intended to be construed as a limitation, and any number of the described operations may be combined in any order and/or in parallel to implement process 800.

At block 802, process 800 may include receiving, from a device having at least one microphone, audio data. In examples, the audio data may represent a user utterance. For example, the audio data may be received from a device that includes at least one microphone, which may be described herein as a microphone array, having a certain microphone array configuration. The microphones of the microphone array may capture audio corresponding to the user utterance and may generate corresponding audio data. In examples, the device may utilize beamforming techniques to optimize the audio data before it is further processed. In these examples, the audio data that is received may represent a single, optimized audio signal. In other examples, such as when the device does not utilize beamforming or other signal optimizing techniques, the audio data may be received as a multi-channel input. In other examples, the audio data may not include a user utterance but instead by include another type of sound, such as a mouse "click," a button push, or inaudible sound. The microphones of the microphone array may capture this audio and generate corresponding audio data.

At block 804, the process 800 may include receiving microphone configuration data indicating a physical arrangement of the at least one microphone. For example, microphone configuration data may be provided by the developer of the device, and that data may be stored in a microphone configuration data component of the memory of the device. In other examples, while microphone configuration data may not be provided by the developer of the device, one or more attributes of the microphones may be described and/or encoded. Information indicating these attributes may be identified, determined, and/or stored. The device may be queried or otherwise utilized to obtain the microphone configuration data and provide the microphone configuration data to the remote system. In examples, one or more database not situated on memory of the device may be queried and/or accessed to identify the microphone configuration data. The microphone array configuration may include indications of the type of microphones, the number of microphones, the spacing between microphones, and the locations of the microphones with respect to each other and/or with respect to other components of the device. In examples, in addition to, or instead of, receiving the microphone configuration data from the device, the process 800 may include generating the microphone configuration data based at least in part on microphone array information associated with the device.

At block 806, the process 800 may include selecting, based at least in part on the microphone configuration data, an acoustic model of acoustic models. For example, a determination may be made that the acoustic model is configured to process speech-recognition requests from devices having the microphone array configuration. The acoustic model may be selected from multiple acoustic models based at least in part on determining that the acoustic model is configured to process the speech-recognition requests from the devices having the configuration. For example, an acoustic model selector may be configured to select an acoustic model of the acoustic models to perform speech recognition. The acoustic model selector may select the acoustic model based at least in part on the microphone configuration data. For example, the acoustic models may be configured and/or trained to process speech-recognition requests from devices with various microphone array configurations. For example, a first acoustic model may be configured and/or trained to process requests from devices with seven microphones in the microphone array with spacing between about one centimeter and about five centimeters. A second acoustic model, for example, may be configured and/or training to process requests from devices with three microphones or four microphones. Based at least in part on the microphone configuration data, the acoustic model selector may analyze the microphone array configuration of the device from which the audio data was received and determine the acoustic model configured to process requests from devices with microphone arrays that match or most closely match the microphone array configuration in question.

At block 808, the process 800 may include associating, utilizing the acoustic model, a sound with the audio data. For example, when the audio data includes a user utterance, a speech recognition engine of the remote system may process the output from the AFE component with reference to information stored in the acoustic models. Alternatively, post front-end processed data, such as feature vectors, may be received by the device executing ASR processing from another source besides the internal AFE. For example, the user device may process audio data into feature vectors, for example using an on-device AFE, and transmit that information to the remote system.

The speech recognition engine may attempt to match received feature vectors to language phonemes and words as known in the selected acoustic model or language models. The speech recognition engine may compute recognition scores for the feature vectors based on acoustic information, language information, and the microphone array input vector. The acoustic information is used to calculate an acoustic score representing a likelihood that the intended sound represented by a group of feature vectors matches a language phoneme. Phoneme data may be generated that correlates the audio data with phonemes. In other examples where the audio data does not include user utterances, sound data may be generated that associates a non-speech sound with the audio data.

The process 800 may additionally, or alternatively, include inputting a feature vector corresponding to a portion of the audio data, also described herein as a frame, and an input vector representing the microphone configuration data into the acoustic model. The process 800 may also include generating, using the acoustic model and based at least in part on the input vector, output data indicating a probability that a sound corresponds to the frame of the audio data. For example, an input vector may be generated from the microphone configuration data. The input vector may be configured to be input into an acoustic model. Generating the input vector may comprise, for example, generating one or more representations of the microphone configuration data, such as numerical and/or textual representations, that may be utilized by the acoustic models.

As to the feature vector, the audio data may be segmented into frames, which represent a time interval of the audio data. For example, each frame of the audio data may be associated with one or more audio frequencies, and each frequency may have an amplitude and phase. An acoustic front end component may reduce noise in the audio data and divide the digitized audio data into the frames, also described herein as audio data frames, representing time intervals for which the AFE component determines a number of values, called features, representing the qualities of the audio data, along with a set of those values, called the feature vector and/or an input vector, representing the features/qualities of the audio data within the frame. Many different features may be determined, and each feature represents some quality of the audio that may be useful for ASR processing. Once the feature vector and input vector are determined and/or generated, they may be input into the acoustic model.

The process 800 may additionally, or alternatively, include identifying a first parameter of the acoustic model that is associated with microphone array configurations. The process 800 may also include determining, from the microphone configuration data, that the configuration of the microphone array differs from the microphone array configuration associated with the first parameter and generating a second parameter based on the microphone configuration data. The process 800 may also include causing the first parameter to be replaced by the second parameter.

The process 800 may additionally, or alternatively, include processing, based at least in part on the microphone configuration data, a first audio signal and a second audio signal of the audio data. For example, the microphone array may include a first microphone and a second microphone, but the device may not include beamforming functionality and/or the beamforming functionality may not be utilized and/or may not produce an optimized audio signal. In these examples, each microphone may produce an audio signal, which may be processed by the remote system to generate beamformed and/or optimized audio data. The optimized audio data may be utilized to perform the sound recognition described herein.

The process 800 may additionally, or alternatively, include generating a trigger-sound component configured to transition at least a portion of the device from a first state to a second state when the device determines that a trigger sound has been uttered. The trigger-sound component may be configured to detect the trigger sound using audio data generated by the microphones configured in the physical arrangement. The process 800 may also include sending, to the device, configuration data representing the trigger-sound component for use by the device to detect the trigger sound. Identification of the trigger sound may cause the device to transition from the first state to the second state. For example, the device may be configured, in the first state, to receive user utterances and locally processes the corresponding audio data to determine if a trigger sound, also described as a wake word, has been spoken by a user.

Based at least in part on identifying the trigger sound, the device may be configured, in the second state, to send audio data to the remote system for more robust speech processing. The trigger-sound component may utilize an ASR component of the device to identify a trigger sound in a user utterance. It should be understood that while the trigger-sound component and its functionality has been described herein as a component that controls the state of the device, description of the various functionalities of the device in terms of states is provided by way of example. Alternatively, state transitions may not be utilized and instead functionalities may be utilized or not utilized depending on the identification of a trigger sound by the trigger-sound component. By way of example, the trigger-sound component may identify the trigger sound "Alexa" in the user utterance and may "wake" based on identifying the trigger sound. Audio data corresponding to the user utterance may be sent to the remote system where a speech recognition engine of the remote system may identify, determine, and/or generate text data corresponding to the user utterance, for example.

The configuration data sent from the remote system to the device may modify and/or replace the trigger sound speech processing of the device such that accuracy of trigger sound detection is improved. For example, once the microphone array configuration is determined, that information may be utilized to select an acoustic model for the device to utilize to detect a trigger sound. In other examples, the microphone array information may be encoded as an input vector that is sent to the device to utilize to detect a trigger sound. In other examples, the acoustic model utilized by the device may be trained based at least in part on the configuration data such that at least a portion of the acoustic model, including, for example, the association of audio data frames to phonemes, is augmented and/or altered.

The process 800 may additionally, or alternatively, include receiving, via the device, global positioning data indicating a location of the device. Additionally, or alternatively, the process 800 may include receiving, via the device, device-location data indicating a location of the device within an environment. Additionally, or alternatively, the process 800 may include receiving, via the device, speaker-location data indicating a location, relative to the device, of a user that provided the user utterance. In examples, the global positioning data, the device-location data, and/or the speaker-location data may represent contextual data. The process 800 may also include inputting a second input vector representing the contextual data into the acoustic model. Generation of the sound data may be based at least in part on the second input vector. For example, the microphone array input vector and/or the contextual input vector may be utilized to modify the features vectors, modify the associations of the feature vectors to the sounds, and/or to modify the likelihood that the intended sound represented by the group of feature vectors matches a language phoneme.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving audio data from a voice interface device having a microphone and in a first device location of a building;
   selecting a first model based at least in part on the first device location and contextual data indicating one or more first physical objects disposed in association with the first device location;
   inputting, into the first model, input data;
   generating, using the first model and based at least in part on the input data, first output data;
   determining that the voice interface device is in a second device location of the building, wherein the second device location is associated with one or more second physical objects that differ from the one or more first physical objects; and
   based at least in part on the voice interface device being in the second device location, selecting a second model to generate second output data, wherein the first model differs from the second model.

2. The method of claim 1, wherein generating the first output data comprises generating text data associated with a subject matter domain of the first model.

3. The method of claim 1, wherein the audio data indicates a distance between the voice interface device and a first device of the building.

4. The method of claim 3, wherein selecting the first model comprises selecting the first model based at least in part on the distance.

5. The method of claim 1, further comprising:
   determining additional audio data from a source within the building; and
   wherein selecting the first model comprises selecting the first model based at least in part on the additional audio data.

6. A system comprising:
   one or more processors; and
   one or more computer-readable media storing instructions that, when executed by the one or more processors, cause the one or more processors to perform operations comprising:
   receiving audio data from a voice interface device having a microphone and in a first device location of a building;
   selecting a first model based at least in part on the first device location and contextual data indicating one or more first physical objects disposed in association with the first device location;
   inputting, into the first model, input data;
   generating, using the first model and based at least in part on the input data, first output data;
   determining that the voice interface device is in a second device location of the building, wherein the second device location is associated with one or more second physical objects that differ from the one or more first physical objects; and
   selecting a second model to generate second output data based at least in part on the voice interface device being in the second device location, wherein the first model differs from the second model.

7. The system of claim 6, wherein the audio data further indicates a distance from the voice interface device to a first device within the building, wherein the first device comprises a source of the contextual data.

8. The system of claim 7, wherein selecting the first model comprises selecting the first model based at least in part on the distance.

9. The system of claim 6, wherein the audio data indicates the first device location with respect to a source of the contextual data.

10. The system of claim 6, further comprising:
    determining that additional audio data comprises the contextual data.

11. The system of claim 6, wherein selecting the second model comprises selecting the second model based at least in part on characteristics of the second device location.

12. The system of claim 6, wherein selecting the second model comprises selecting the second model based at least in part on a positioning of the microphone relative to the second device location.

13. The system of claim 6, wherein selecting the second model comprises selecting the second model based at least in part on a device state of the voice interface device.

14. The system of claim 6, wherein account data associated with the voice interface device indicates the first device location and the second device location are of the building.

15. A method comprising:
    receiving audio data from a first device having a microphone and at a first device location of a building;
    selecting a first model based at least in part on the first device location and contextual data indicating one or more first physical objects disposed in association with the first device location;
    generating, using the first model and input data, output data;
    determining that the first device is in a second device location of the building, wherein the second device location is associated with one or more second physical objects that differ from the one or more first physical objects; and
    selecting a second model to generate second output data based at least in part on the second device location, wherein the first model differs from the second model.

16. The method of claim 15, further comprising:
    determining an environmental context associated with at least a portion of the audio data; and
    wherein selecting the first model comprises selecting the first model based at least in part on the environmental context.

17. The method of claim 15, wherein generating the output data comprises generating text data representing the audio data, the text data associated with a subject matter domain of the first model.

18. The method of claim 15, wherein the audio data indicates a source of the contextual data.

19. The method of claim 15, further comprising:
- determining a distance between the first device and a second device in the building; and
- wherein selecting the first model comprises selecting the first model based at least in part on the distance.

20. The method of claim 15, further comprising:
- determining that a distance between the first device and a second device in the building satisfies a threshold distance; and
- wherein the selecting the first model comprises selecting the first model based at least in part on the distance satisfying the threshold distance.

\* \* \* \* \*